US012162293B2

(12) United States Patent
Momoka

(10) Patent No.: US 12,162,293 B2
(45) Date of Patent: Dec. 10, 2024

(54) EXPOSURE HEAD AND IMAGE FORMING APPARATUS INCLUDING EXPOSURE HEAD

(71) Applicant: CANON KABUSHIKI KAISHA, Tokyo (JP)

(72) Inventor: Toshiki Momoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 17/724,608

(22) Filed: Apr. 20, 2022

(65) Prior Publication Data

US 2022/0342338 A1 Oct. 27, 2022

(30) Foreign Application Priority Data

Apr. 22, 2021 (JP) ................................ 2021-072340

(51) Int. Cl.
*B41J 2/45* (2006.01)
*G03G 15/04* (2006.01)

(52) U.S. Cl.
CPC ................. *B41J 2/45* (2013.01); *B41J 2/451* (2013.01); *G03G 15/04* (2013.01); *G03G 15/04045* (2013.01); *G03G 15/04054* (2013.01); *G03G 15/0409* (2013.01)

(58) Field of Classification Search
CPC ......... G03G 15/04054; G03G 15/0409; G03G 15/04; G03G 15/04045; B41J 2/451; B41J 2/45
See application file for complete search history.

(56) References Cited

U.S. PATENT DOCUMENTS

| | | | | |
|---|---|---|---|---|
| 6,025,863 A * | 2/2000 | Nakajima | B41J 2/451 | 347/241 |
| 2007/0248381 A1* | 10/2007 | Akioka | G03G 9/135 | 399/136 |
| 2012/0062686 A1* | 3/2012 | Suto | B41J 2/451 | 347/224 |
| 2012/0075403 A1 | 3/2012 | Nagamine et al. | | |
| 2014/0098171 A1* | 4/2014 | Tanigawa | G03G 15/04036 | 347/118 |
| 2017/0289384 A1* | 10/2017 | Suzuki | H04N 1/23 | |
| 2020/0292985 A1 | 9/2020 | Aruga et al. | | |

* cited by examiner

*Primary Examiner* — Justin Seo
*Assistant Examiner* — Kendrick X Liu
(74) *Attorney, Agent, or Firm* — Venable LLP

(57) ABSTRACT

An exposure head configured to expose a photoreceptor includes a substrate having a plurality of light emitting portions, a lens array having a plurality of lenses that condense light emitted from the light emitting portions onto the photoreceptor, and a holder that holds the substrate and the lens array. The holder has an opposing surface including an opening into which the lens array is inserted and facing the photoreceptor in an optical axis direction of the lens. The opposing surface has a contacting surface on which a cleaning rod cleaning a light exit surface of the lens array abuts. The holder includes a sealing agent that seals a gap between a side wall of the lens array and an edge of the opening along a longitudinal direction of the holder, and a groove formed in the opposing surface between the opening and the contacting surface. The sealing agent is applied between the groove and the side wall.

19 Claims, 19 Drawing Sheets

EXPOSURE HEAD AND IMAGE FORMING APPARATUS INCLUDING EXPOSURE HEAD

BACKGROUND OF THE INVENTION

Field of the Invention

The present invention relates to an exposure head that exposes a photoreceptor and an image forming apparatus including the exposure head.

Description of the Related Art

Some image forming apparatuses such as printers and copying machines include an exposure head including a plurality of light emitting elements for exposing a photosensitive drum. The exposure head includes a light emitting diode (LED) as a light emitting element that emits light, and exposes the photosensitive drum to the light emitted from the plurality of LEDs. Some light emitting elements that emit light include organic electro luminescence (EL). The organic EL may be referred to as an organic light emitting diode (OLED). The plurality of LEDs is arranged on a substrate, and light emitted from the plurality of LEDs is condensed on the photosensitive drum by a lens array.

An exposure head proposed in US 2012/0075403 will be described with reference to FIG. 19. An exposure head 300 includes a light emitting substrate 301 on which a plurality of LED array chips 301*a* having a plurality of light emitting elements is mounted, a lens array 302 for converging light emitted from the light emitting substrate 301, and a housing (holder) 303 for holding the light emitting substrate 301 and the lens array 302. The holder 303 has an opening 303*a* for holding and fixing the light emitting substrate 301. The lens array 302 is held and fixed to the opening 303*a* by an adhesive. Thereafter, a sealing agent 304 is applied to a gap between the lens array 302 and the housing 303 to which the opening 303*a* is held and fixed. This prevents entry of foreign matter into the exposure head 300.

Generally, the exposure head is disposed between a charging device and a development device. In recent years, an image forming apparatus has been required to be downsized, and an interval between the charging device and the development device has been narrowed. Since the exposure head is disposed in the gap, the width of the holder tends to be narrower.

In addition, a general sealing agent requires time to cure a surface thereof, and flows to an unintended portion in a state where the surface is not cured. Therefore, when the width of the holder is narrowed, there is a possibility that the sealing agent is cured in a state of flowing out to an unintended portion in the holder.

In addition, when dust such as toner adheres to a light exit surface of the lens array, part of light for exposing the photosensitive drum is blocked by the dust, which causes image defects. Therefore, a configuration in which a user periodically cleans the light exit surface of the lens array using a cleaning rod is common. When the light exit surface of the lens array is cleaned using the cleaning rod, a part of the cleaning rod comes into contact with the holder, whereby the position of the cleaning rod with respect to the holder is determined. That is, the user inserts and removes the cleaning rod into and from the image forming apparatus with a part of the cleaning rod in contact with the holder.

However, when the sealing agent is cured at an unintended place in the holder, the cleaning rod and the sealing agent buffer each other when the cleaning rod is inserted and removed for cleaning, and there is a possibility that an operational feeling for the user is deteriorated.

SUMMARY OF THE INVENTION

According to an aspect of the present invention, there is provided an exposure head configured to expose a photoreceptor, the exposure head including:

- a substrate including a plurality of light emitting portions configured to emit light to expose the photoreceptor;
- a lens arrays including a plurality of lens configured to condense the light emitted from the light emitting portion onto the photoreceptor; and
- a holder configured to hold the substrate and the lens array,
- in which the holder includes:
  - an opposing surface including an opening into which the lens array is inserted, facing the photoreceptor in an optical axis direction of the lens, and having a contacting surface on which a cleaning rod cleaning a light exit surface of the lens array abuts;
  - a sealing agent configured to seal a gap between a side wall of the lens array and an edge of the opening along a longitudinal direction of the holder; and
  - a groove formed in the opposing surface between the opening and the contacting surface, and
- the sealing agent is applied between the groove and the side wall.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. The dimensions, materials, shapes, relative arrangements, and the like of components described below are not intended to limit the scope of the present invention only to them unless otherwise specified.

(Image Forming Apparatus)

Figure 1A:
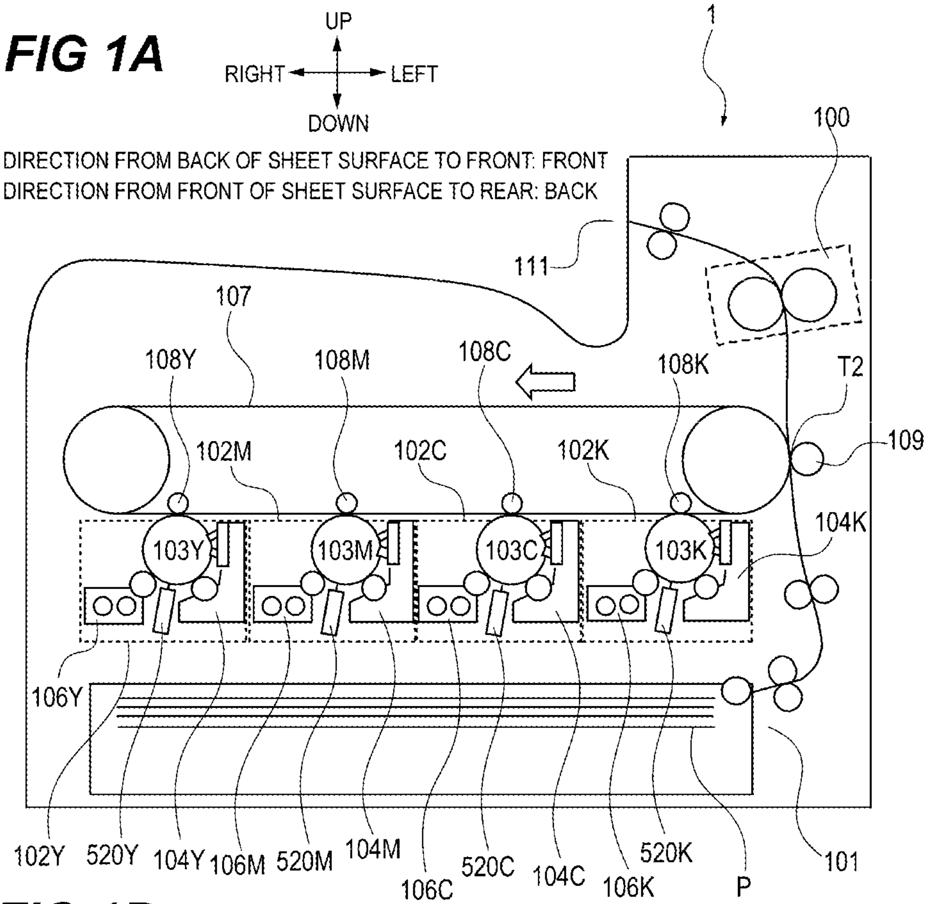
FIGS. 1A and 1B are cross-sectional views illustrating a schematic configuration of an image forming apparatus.

First, a schematic configuration of an image forming apparatus 1 will be described with reference to FIG. 1A. FIG. 1A is a schematic cross-sectional view of the image forming apparatus 1. Although the image forming apparatus 1 illustrated in FIG. 1A is a color printer (SFP: Single Function Printer) that does not include a reading device, the embodiment may be a copying machine that includes a reading device. In addition, the embodiment is not limited to a color image forming apparatus including a plurality of photosensitive drums 103 as illustrated in FIG. 1A, and may be a color image forming apparatus including one photosensitive drum 103 or an image forming apparatus that forms a monochrome image.

The image forming apparatus 1 illustrated in FIG. 1A includes four image forming portions 102Y, 102M, 102C, and 102K (hereinafter, it is also collectively and simply referred to as an "image forming portion 102") that form toner images of respective colors of yellow, magenta, cyan, and black. The image forming portions 102Y, 102M, 102C, and 102K include photosensitive drums 103Y, 103M, 103C, and 103K (hereinafter, it is also collectively and simply referred to as a "photosensitive drum 103"), which are examples of photoreceptors, respectively. The photosensitive drum 103 may be a photosensitive belt. Further, the image forming portions 102Y, 102M, 102C, and 102K include charging devices 104Y, 104M, 104C, and 104K (hereinafter, it is also collectively and simply referred to as a "charging device 104") as charging portions that respectively charge the photosensitive drums 103Y, 103M, 103C, and 103K. In addition, the image forming portions 102Y, 102M, 102C, and 102K include light emitting diode (Light Emitting Diodes, hereinafter referred to as LEDs) exposure units 520Y, 520M, 520C, and 520K (hereinafter, also collectively and simply referred to as an "exposure unit 520") as exposure light sources that emit light for exposing the photosensitive drums 103Y, 103M, 103C, and 103K. Further, the image forming portions 102Y, 102M, 102C, and 102K include development devices 106Y, 106M, 106C, and 106K (hereinafter, also collectively and simply referred to as a "development device 106") as developing units that develop an electrostatic latent image on the photosensitive drum 103 with toner and develop a toner image of each color on the photosensitive drum 103. Note that Y, M, C, and K attached to the reference numerals indicate the colors of the toner.

Figure 1B:
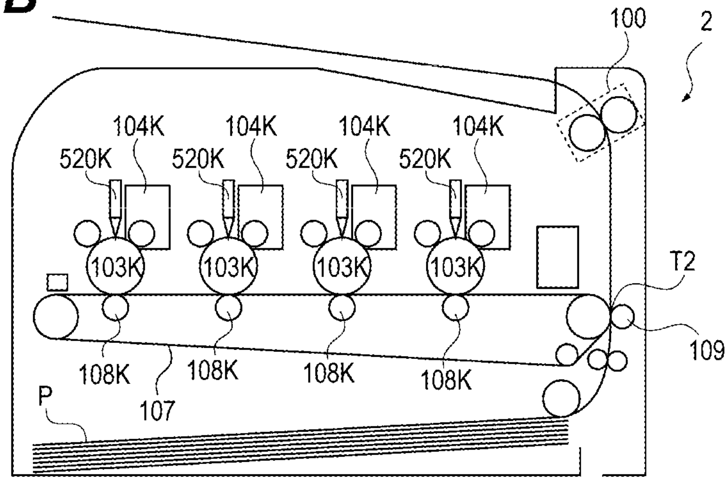

The image forming apparatus 1 illustrated in FIG. 1A is an image forming apparatus that adopts a so-called "lower surface exposure system" that exposes the photosensitive drum 103 to light from below. Hereinafter, a description will be given on the premise of an image forming apparatus adopting the lower surface exposure system, but as an embodiment, an image forming apparatus adopting an "upper surface exposure system" that exposes the photosensitive drum 103 to light from above, such as the image forming apparatus 2 illustrated in FIG. 1B, may be used. In FIG. 1B, the same reference numerals are given to portions illustrating the same configuration as in FIG. 1A.

The image forming apparatus 1 includes an intermediate transfer belt 107 to which a toner image formed on the photosensitive drum 103 is transferred, and a primary transfer roller 108(Y, M, C, K) that sequentially transfers the toner image formed on the photosensitive drum 103 to the intermediate transfer belt 107. In addition, the image forming apparatus 1 includes a secondary transfer roller 109 as a transfer portion that transfers the toner image on the intermediate transfer belt 107 onto a recording sheet P conveyed from a sheet feeding portion 101, and a fixing device 100 that fixes the secondarily transferred image onto the recording sheet P. In addition to the intermediate transfer method using the intermediate transfer belt 107 described above, a direct transfer method of directly transferring from the photosensitive drum 103 to a sheet may be used.

(Image Forming Process)

Next, an image forming process of the image forming apparatus will be briefly described. The charging device 104Y charges the surface of the photosensitive drum 103Y. The exposure unit 520Y exposes the surface of the photosensitive drum 103Y charged by the charging device 104Y. As a result, an electrostatic latent image is formed on the photosensitive drum 103Y. Next, the development device 106Y develops the electrostatic latent image formed on the photosensitive drum 103Y with yellow toner. The yellow toner image developed on the surface of the photosensitive drum 103Y is transferred onto the intermediate transfer belt 107 by the primary transfer roller 108Y. Magenta, cyan, and black toner images are also formed by a similar image forming process and transferred so as to be superimposed on the intermediate transfer belt 107.

The toner image of each color transferred onto the intermediate transfer belt 107 is conveyed to a secondary transfer portion T2 by the intermediate transfer belt 107. A transfer bias for transferring the toner image onto the recording sheet P is applied to the secondary transfer roller 109 disposed on the secondary transfer portion T2. The toner image conveyed to the secondary transfer portion T2 is transferred to the recording sheet P conveyed from the sheet feeding portion 101 by the transfer bias of the secondary transfer roller 109. The recording sheet P to which the toner image has been transferred is conveyed to the fixing device 100. The fixing device 100 fixes the toner image on the recording sheet P by heat and pressure. The recording sheet P subjected to the fixing process by the fixing device 100 is ejected to a sheet ejection portion 111.

(Drum Unit and Developing Unit)

Figure 2A:
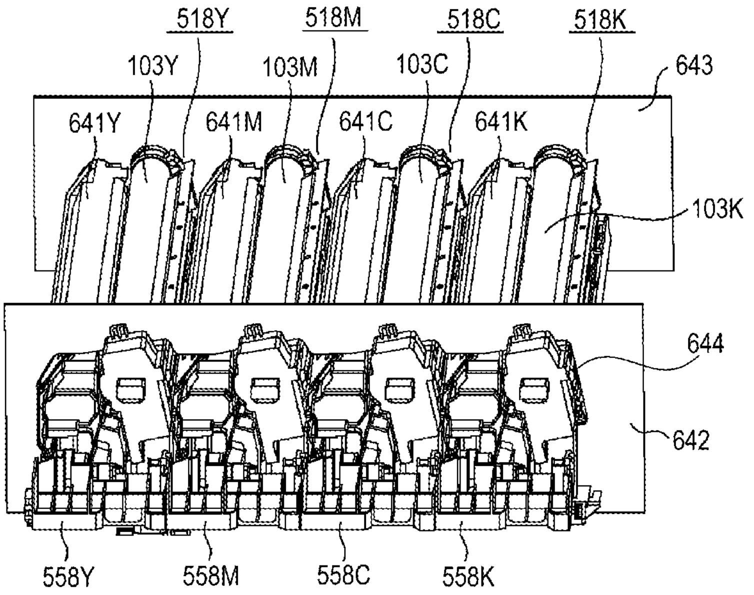
FIGS. 2A and 2B are views for describing a configuration around a drum unit and a developing unit.
Figure 2B:
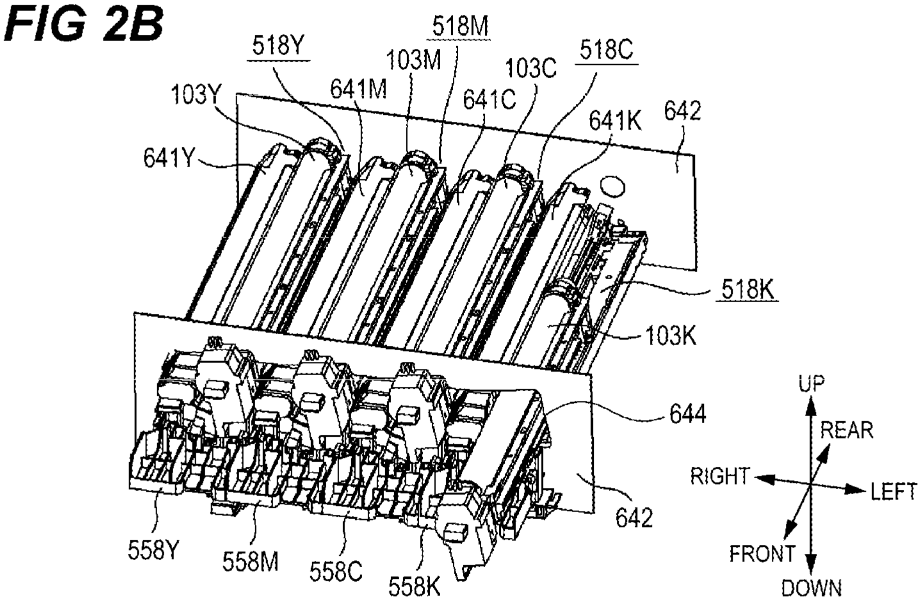

A replaceable drum unit in the image forming apparatus of the present embodiment will be described by way of example. The photosensitive drum 103 and the charging device 104 described above may be integrally unitized (drum unit, drum cartridge) together with a cleaning device not illustrated. An example of the configuration will be described with reference to FIGS. 2A and 2B. FIG. 2A is a perspective view illustrating a schematic structure of a periphery of a drum unit 518 (Y, M, C, K) and a periphery of a developing unit 641 (Y, M, C, K) included in the image forming apparatus 1. FIG. 2B is a view illustrating a state in which the drum unit 518 is inserted into the image forming apparatus 1 from the outside of an apparatus body.

Drum units 518Y, 518M, 518C, and 518K (hereinafter, also collectively and simply referred to as the "drum unit 518") including the photosensitive drums 103 are attached to the image forming apparatus 1. The drum unit 518 is a cartridge to be replaced by an operator such as a user or a maintenance person. The drum unit 518 rotatably supports the photosensitive drum 103. Here, the drum unit 518 also functions as a drum support member that rotatably supports the photosensitive drum 103. In the present embodiment, the drum support member is also referred to as the drum unit 518. Specifically, the photosensitive drum 103 is rotatably supported by a frame body of the drum unit 518. The drum unit 518 may not include the charging device 104 or the cleaning device.

In addition, developing units 641Y, 641M, 641C, and 641K (hereinafter, also collectively and simply referred to as a "developing unit 641") separate from the drum unit 518 are attached to the image forming apparatus 1 of the present embodiment. The developing unit 641 of the present embodiment is a cartridge in which the development device 106 and a toner storage portion illustrated in FIG. 1A are integrated. The development device 106 includes a developing sleeve (not illustrated) that carries a developer. The developing unit 641 is provided with a plurality of gears for rotating screws for stirring the toner and the carrier. When these gears deteriorate over time or the like, an operator detaches and replaces the developing unit 641 from the apparatus body of the image forming apparatus 1. The embodiment of the drum unit 518 and the developing unit 641 may be a process cartridge in which the drum unit 518 and the developing unit 641 are integrated.

As illustrated in FIG. 2A, the image forming apparatus 1 includes a front plate 642 formed of sheet metal and a rear plate 643 similarly formed of sheet metal. The front plate 642 is a side wall provided on a front side of the image forming apparatus 1. The front plate 642 forms a part of a housing of the apparatus body on the front side of the apparatus body of the image forming apparatus 1. The rear plate 643 is a side wall provided on a rear side of the image forming apparatus 1. The rear plate 643 forms a part of a housing of the apparatus body on the back side of the apparatus body of the image forming apparatus 1. As illustrated in FIG. 2A, the front plate 642 and the rear plate 643 are arranged to face each other, and a sheet metal (not illustrated) as a beam is bridged therebetween. Each of the front plate 642, the rear plate 643, and a beam (not illustrated) constitutes a part of the frame body of the image forming apparatus 1. Here, regarding the image forming apparatus 1 of the present embodiment or the constituent members thereof, the front side or the front side is a side on which the drum unit 518 is taken in and out (inserted and removed) with respect to the apparatus body.

An opening 644 is formed in the front plate 642 so that the drum unit 518 and the developing unit 641 can be inserted into and removed from the front side of the image forming apparatus 1. The drum unit 518 and the developing unit 641 are mounted at a predetermined position (mounting position) of the apparatus body of the image forming apparatus 1 via the opening 644. In addition, the image forming apparatus 1 includes covers 558Y, 558M, 558C, and 558K (hereinafter, also collectively and simply referred to as a "cover 558") that cover front sides of both the drum unit 518 and the developing unit 641 mounted at the mounting position. One end of the cover 558 is fixed to the apparatus body of the image forming apparatus 1 by a hinge, and is rotatable with respect to the apparatus body of the image forming apparatus 1 by the hinge. The operator opens the cover 558, takes out the drum unit 518 or the developing unit 641 in the main body, inserts the new drum unit 518 or developing unit 641, and closes the cover 558, whereby the replacement work is completed.

Figure 3:
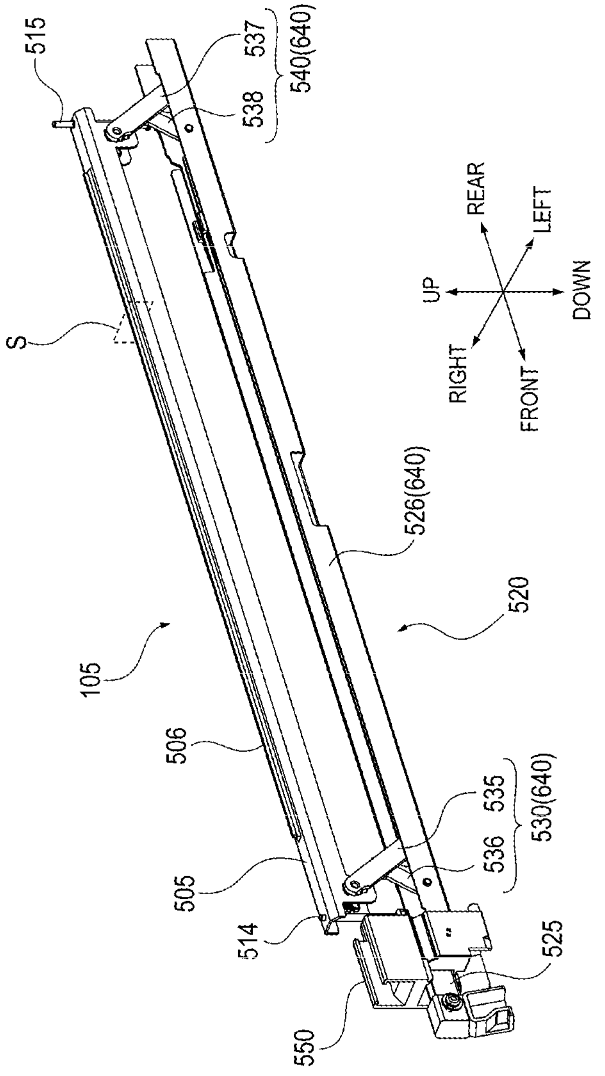
FIG. 3 is a schematic perspective view of an exposure unit.

Here, as illustrated in FIGS. 2A and 2B, in the following descriptions, the front plate 642 side is defined as a front side (front surface side), and the rear plate 643 side is defined as a rear side (back side or back surface side) with respect to the apparatus body. When the photosensitive drum 103K on which an electrostatic latent image related to a black toner image is formed is used as a reference, a side on which the photosensitive drum 103Y on which the electrostatic latent image related to the yellow toner image is formed is disposed is defined as a right side. When the photosensitive drum 103Y on which an electrostatic latent image related to a yellow toner image is formed is used as a reference, a side on which the photosensitive drum 103K on which the electrostatic latent image related to the black toner image is formed is disposed is defined as a left side. Furthermore, a direction perpendicular to a front-back direction and a right-left direction defined here and upward in a vertical direction is defined as an upward direction, and a direction perpendicular to the front-back direction and the right-left direction defined here and downward in the vertical direction is defined as a downward direction. The defined forward, backward, rightward, leftward, upward, and downward directions are illustrated in FIGS. 2A, 2B, and 3.

A rotational axis direction of the photosensitive drum 103 described in the following text is a direction that coincides with the front-back direction illustrated in FIGS. 2A and 2B. A longitudinal direction of the exposure head 105 is also a direction that coincides with the front-back direction illustrated in FIGS. 2A and 2B. That is, the rotational axis direction of the photosensitive drum 103 coincides with the longitudinal direction of the exposure head 105. In addition, one end side in the rotational axis direction of the photosensitive drum 103 means a front side defined herein, and the other end side means a rear side defined herein. One end side and the other end side in the front-back direction also correspond to the front side and the rear side defined here. One end side in the right-left direction means the right side defined here, and the other end side means the left side defined here.

(Exposure Unit)

Next, the exposure unit 520 including the exposure head 105 will be described with reference to FIG. 3. FIG. 3 is a schematic perspective view of the exposure unit 520 included in the image forming apparatus 1 of the present embodiment.

The exposure head 105 has an elongated shape (longitudinal shape) extending in the rotational axis direction of the photosensitive drum 103. Furthermore, the exposure head 105 includes a holding member 505 (an example of a holder), a lens array 506, and a substrate 502 (see FIGS. 4A to 4E). The holding member 505 holds the lens array 506 and the substrate 502. In the present embodiment, the holding member 505 is a metal member formed by bending a plate material obtained by plating a galvanized steel plate or a cold-rolled steel plate. Here, as an example of an exposure system adopted in an electrophotographic image forming apparatus, there is a laser beam scanning exposure system in which an irradiation beam of a semiconductor laser is scanned with a rotating polygon mirror or the like, and the photosensitive drum is exposed through an f-θ lens or the like. The "exposure head 105" described in the present embodiment is used in an LED exposure system for exposing the photosensitive drum 103 using light emitting elements such as LEDs arranged along the rotational axis direction of the photosensitive drum 103, and is not used in the laser beam scanning exposure system described above.

The exposure unit 520 described in the present embodiment is provided below the rotational axis of the photosensitive drum 103 in the vertical direction. LEDs as light emitting elements are provided on the substrate 502 included in the holding member 505, and the light emitting elements expose the photosensitive drum 103 from below. However, the exposure unit 520 may be provided above the rotational axis of the photosensitive drum 103 in the vertical direction, and the photosensitive drum 103 may be exposed from above (see FIG. 1B).

As illustrated in FIG. 3, the exposure unit 520 includes the exposure head 105, a support member 526, a first link mechanism 530, and a second link mechanism 540. The support member 526, the first link mechanism 530, and the second link mechanism 540 constitute a moving mechanism 640 that moves the exposure head 105.

The holding member 505 of the exposure head 105 is provided with a contact pin 514 and a contact pin 515. Each of the contact pin 514 and the contact pin 515 is an example of a metal pin. For example, the contact pin 515 is provided on the holding member 505 on one side (rear side) of the lens array 506 in the rotational axis direction of the photosensitive drum 103, and protrudes from both sides of the holding member 505 in the optical axis direction of the lens array 506. The same applies to the contact pin 514. When the contact pin 514 and the contact pin 515 abut on the drum unit 518, a gap is formed between the lens array 506 and the photosensitive drum 103. Thus, the position of the exposure head 105 with respect to the photosensitive drum 103 is determined. In the present embodiment, both the contact pin 514 and the contact pin 515 are metal straight pins. The contact pin 514 and the contact pin 515 are fixed to the metallic holding member 505 by welding. As described above, in the present embodiment, the contact pin 514 and the contact pin 515 are integrated with the holding member 505.

The first link mechanism 530 includes a link member 535 and a link member 536. The second link mechanism 540 includes a link member 537 and a link member 538. The link member 535 is attached to the front side of the center of the holding member 505 in the rotational axis direction of the photosensitive drum 103, and the link member 537 is attached to the rear side of the center of the holding member 505 in the rotational axis direction of the photosensitive drum 103.

As the cover 558 (see FIGS. 2A and 2B) provided on the front side of the image forming apparatus 1 opens and closes, the slide member 525 slides in the front-back direction. The link members 535 to 538 rotate in conjunction with the sliding movement of the slide member 525, and the exposure head 105 moves in an up-down direction.

In the present embodiment, the exposure head 105 is provided below the photosensitive drum 103 in the vertical direction. That is, in the image forming apparatus 1 according to the present embodiment, the exposure head 105 exposes the photosensitive drum 103 to light from below in the vertical direction.

Furthermore, as illustrated in FIG. 3, the exposure unit 520 includes the support member 526. The support member 526 supports the exposure head 105 via the first link mechanism 530 and the second link mechanism 540. Specifically, the link member 535 of the first link mechanism 530 supports the holding member 505, and the link member 537 of the second link mechanism 540 supports the holding member 505.

The support member 526 is formed by bending a sheet metal into a U-shape. The support member 526 is a member having a longitudinal shape extending in the rotational axis direction of the photosensitive drum 103. One end side (front side) of the support member 526 in the longitudinal direction of the support member 526 is fixed to the front plate 642, and the other end side (back side) of the support member 526 in the longitudinal direction of the support member 526 is fixed to the rear plate 643. Thus, the position of the support member 526 with respect to the photosensitive drum 103 is fixed on the side opposite to the side where the photosensitive drum 103 is disposed with respect to the holding member 505.

The support member 526 includes the slide member 525 movable in the longitudinal direction of the support member 526. As the slide member 525 moves with respect to the support member 526, the link members 535 to 538 rotate, and the exposure head 105 moves with respect to the support member 526.

An insertion portion 550 into which a cleaning unit (a cleaning rod 900 illustrated in FIG. 15) to be described later is inserted is fixed to the support member 526. Since the support member 526 is fixed to the apparatus body of the image forming apparatus 1, the insertion portion 550 is also fixed to the apparatus body of the image forming apparatus 1.

(Substrate and Lens Array)

Figure 4A:
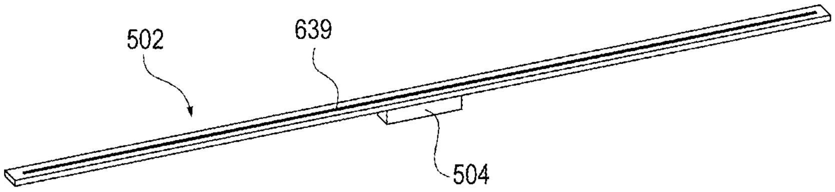
FIGS. 4A, 4B, and 4C are views illustrating a substrate in an exposure head.
Figure 4B:
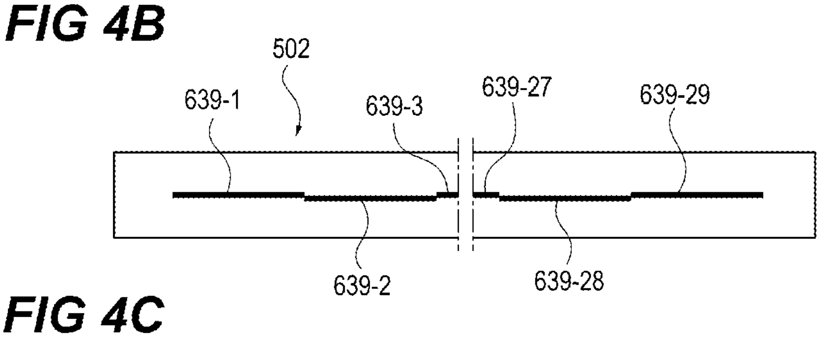
Figure 4C:
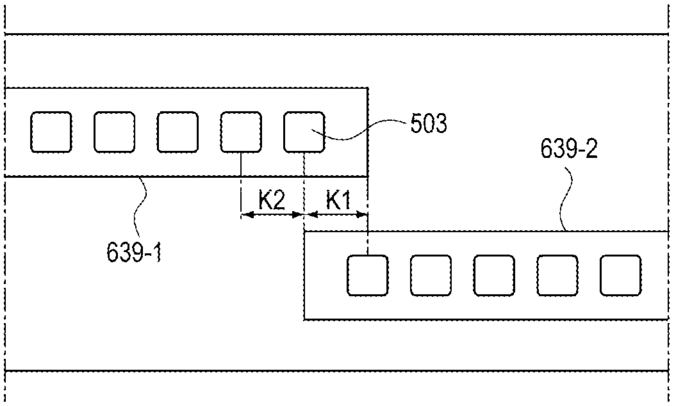

Next, the substrate 502 and the lens array 506 held by the holding member 505 of the exposure head 105 will be described with reference to FIGS. 4A to 4E. First, the substrate 502 will be described. FIG. 4A is a schematic perspective view of the substrate 502. FIG. 4B illustrates an arrangement of the plurality of LEDs 503 provided on the substrate 502, and FIG. 4C illustrates an enlarged view of FIG. 4B.

An LED chip 639 is mounted on the substrate 502. As illustrated in FIG. 4A, the LED chip 639 is provided on one surface of the substrate 502, and a connector 504 is provided on the back surface side thereof. The "one surface" referred to herein, that is, the surface on the side on which the LED chip 639 is provided is defined as a "light exit surface". In other words, of the front and back surfaces of the substrate 502, the surface on the side where light is emitted toward the photosensitive drum 103 is the light exit surface. A wire for supplying a signal to each LED chip 639 is provided on the substrate 502. One end of a flexible flat cable (FFC) (not illustrated) is connected to the connector 504. The apparatus body of the image forming apparatus 1 is provided with a substrate. The substrate includes a controller and a connector. The other end of the FFC is connected to the connector. A control signal is input to the substrate 502 from a controller of the apparatus body of the image forming apparatus 1 via the FFC and the connector 504. The LED chip 639 is driven by a control signal input to the substrate 502.

The LED chip 639 mounted on the substrate 502 will be described in more detail. As illustrated in FIGS. 4B and 4C, LED chips 639-1 to 639-29 (29) in which a plurality of LEDs 503 is arranged are arranged on one surface of the substrate 502. In each of the LED chips 639-1 to 639-29, 516 LEDs (light emitting elements) are arranged in a longitudinal direction of each LED chip. A center-to-center distance k2 between the LEDs adjacent in the longitudinal direction of the LED chip 639 corresponds to a resolution of an image forming apparatus 1. Since the resolution of the image forming apparatus 1 of the present embodiment is 1200 dpi, the LEDs are arranged such that the center-to-center distance between the adjacent LEDs is 21.16 μm in the longitudinal direction of the LED chips 639-1 to 639-29. Therefore, an exposure range of the exposure head 105 of the present embodiment is about 316 mm. A photosensitive layer of the photosensitive drum 103 is formed to have a width of 316 mm or more. Since a length of a long side of an A4-size recording sheet and a length of a short side of an A3-size recording sheet are 297 mm, the exposure head 105 of the present embodiment has an exposure range in which an image can be formed on the A4-size recording sheet and the A3-size recording sheet.

The plurality of LED chips 639-1 to 639-29 is arranged in the rotational axis direction of the photosensitive drum 103. Specifically, the LED chips 639-1 to 639-29 are alternately arranged in two rows along the rotational axis direction of the photosensitive drum 103. That is, as illustrated in FIG. 4B, odd-numbered LED chips 639-1, 639-3, . . . , 639-29 counted from the left side are mounted in a line in the longitudinal direction of the substrate 502. Further, the even-numbered LED chips 639-2, 639-4, . . . , 639-28 counted from the left side are mounted in a line in the longitudinal direction of the substrate 502. The LED chip 639 is arranged in this manner. As a result, as illustrated in FIG. 4C, in the longitudinal direction of the LED chip 639, the center-to-center distance k1 of the LEDs 503 arranged at one end of one LED chip 639 and the other end of the other LED chip 639 in the different adjacent LED chips 639 can be made equal to the center-to-center distance k2 of the adjacent LED 503 on one LED chip 639.

In the present embodiment, the light emitting element is a semiconductor LED which is a light emitting diode, but may be, for example, an organic light emitting diode (OLED). This OLED is also called organic electro-luminescence (EL), and is a current-driven light emitting element. The OLEDs are arranged on a line along a main scanning direction (a rotational axis direction of the photosensitive drum 103) on a thin film transistor (TFT) substrate, for example, and are electrically connected in parallel by a power supply wire similarly provided along the main scanning direction.

Figure 4D:
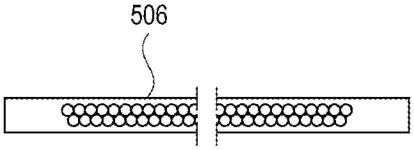
FIGS. 4D and 4E are views illustrating a lens array.
Figure 4E:
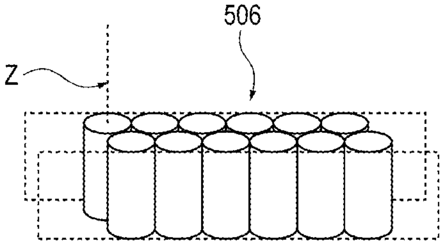

Next, the lens array 506 will be described. FIG. 4D is a schematic view of the lens array 506 as viewed from the photosensitive drum 103 side. FIG. 4E is a schematic perspective view of the lens array 506. As illustrated in FIG. 4D, the lens array 506 condenses the light emitted from the light emitting element on the photosensitive drum 103. The lens array 506 includes a plurality of lenses. The plurality of lenses is arranged in two rows along the arrangement direction of the plurality of LEDs 503. Each lens is alternately arranged such that one of the lenses in the other column is arranged so as to be in contact with both of the adjacent lenses in the arrangement direction of the lenses in one column. Each lens is a columnar rod lens made of glass, and has an incident surface 506*b* on which the light emitted from the LED 503 is incident and an exit surface 506*a* from which the light incident from the incident surface is emitted (see FIG. 9). The material of the lens is not limited to glass, and may be plastic. The shape of the lens is not limited to the columnar shape, and may be, for example, a polygonal prism such as a hexagonal prism.

A dotted line Z illustrated in FIG. 4E indicates an optical axis of the lens. The exposure head 105 is moved in a direction substantially along the optical axis of the lens indicated by the dotted line Z by the above-described moving mechanism 640 (see FIG. 3). The optical axis of the lens herein means a line connecting the center of the exit surface of the lens and the focal point of the lens. As illustrated in FIGS. 4A to 4E, the lens array 506 includes a plurality of lenses. The "optical axis" described above is an optical axis of an arbitrary lens among the plurality of lenses. Here, strictly speaking, the plurality of lenses included in the lens array 506 may be slightly inclined to each other. This is due to tolerance during assembly. However, the deviation of the tolerance is not considered when the direction of the optical axis is defined. Therefore, it is considered that the optical axes of the plurality of lenses are in the same direction. The lens array 506 has a function of condensing the light emitted from the LED 503 on the surface of the photosensitive drum 103.

The plurality of LEDs 503 provided on the substrate 502 described above and the lens array 506 are held by the holding member 505 so as to face each other. As a result, the light emitted from the plurality of LEDs 503 is condensed on the photosensitive drum 103 by the lens array 506. Here, in the present embodiment, the light emitted from the three LEDs 503 (the plurality of LEDs 503) can pass through the same one lens. In addition, even light emitted from one LED 503 can pass through a plurality of lenses because the light travels radially. That is, the light emitted from the plurality of LEDs 503 passes through the lens array 506 (some of the plurality of lenses included in the lens array 506) to expose the photosensitive drum 103.

In addition, an organic EL (also referred to as an OLED) may be used as a light source that emits light for exposing the photosensitive drum 103. A substrate using an organic EL as a light source will be described with reference to FIGS. 5 and 6A to 6C.

Figure 5:
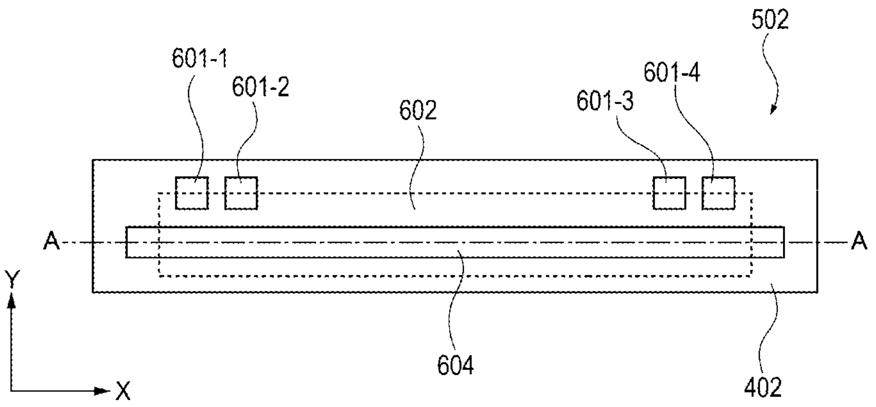
FIG. 5 is a view for describing a substrate having an OLED.

FIG. 5 is a view for describing the substrate 502 in a case where the OLED is used as a light emitting element. This drawing illustrates an internal configuration of the substrate 502. Here, as illustrated in FIG. 5, a longitudinal direction of the substrate 502 is defined as an X direction, and a lateral direction thereof is defined as a Y direction. Here, the Y direction is a rotation direction of the photosensitive drum 103, in other words, a movement direction of a photosensitive surface (surface of the photoreceptor) of the rotating photosensitive drum 103. The X direction is a direction substantially orthogonal to the Y direction, that is, the rotation direction of the photosensitive drum 103. The X direction is also a direction substantially parallel to the rotational axis direction of the photosensitive drum 103. Note that substantially orthogonal allows an inclination of about ±1° with respect to an angle of 90°, and substantially parallel allows an inclination of about ±1° with respect to an angle of 0°. That is, the longitudinal direction of the substrate 502 may be inclined by about ±1° with respect to the rotational axis direction of the photosensitive drum 103. The lateral direction of the substrate 502 may also be inclined by about ±1° with respect to the rotation direction of the photosensitive drum 103. In the substrate 502, wire bonding pads (hereinafter, referred to as a WB pad) 601-1, 601-2, 601-3, and 601-4 are formed on a silicon substrate 402. Note that a circuit portion 602 (broken line) is built in the silicon substrate 402. As the circuit portion 602, a configuration including an analog drive circuit, a digital control circuit, or both of them can be used. Power supply to the circuit portion 602 and input and output of signals and the like from the outside of the substrate 502 are performed via the WB pad 601.

The substrate 502 having the OLED includes a linear light emitting region 604 extending along the rotational axis direction of the photosensitive drum 103. The light emitting region 604 includes an anode, a cathode, and a light emitting layer 450 (see FIGS. 6A to 6C) to be described later, and emits light when a potential difference is generated between the anode and the cathode.

The circuit portion 602 is provided with a driving portion that drives the light emitting region 604 and a light emission signal generating portion that generate a signal (hereinafter, referred to as a light emission signal) for causing the light emitting region 604 to emit light. Then, the circuit portion 602 is formed on the silicon substrate 402. As a result, a circuit capable of coping with high speed is formed.

Figure 6A:
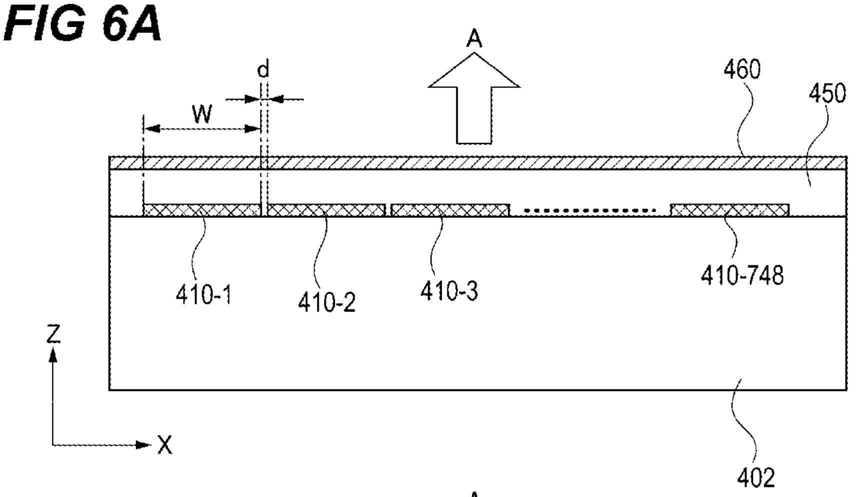
FIGS. 6A, 6B, and 6C are views for describing an internal structure of the substrate having the OLED.

The substrate 502 in the case of using the OLED will be described in more detail with reference to FIGS. 6A to 6C. The X direction in FIGS. 6A to 6C indicates the longitudinal direction of the substrate 502 (see FIG. 5). The Z direction is a direction (lamination direction) in which each layer of a layer structure described later overlaps. FIG. 6A is an enlarged view of a main portion of a schematic view taken along line A-A in FIG. 5. FIG. 6A is a schematic view of lower electrodes 410-1 to 410-748 described later as viewed from the Y direction. As illustrated in FIGS. 6A and 6C, the substrate 502 includes the silicon substrate 402, the lower electrodes 410-1 to 410-748, the light emitting layer 450, and an upper electrode 460. The silicon substrate 402 is a drive substrate on which a drive circuit including a driving portion corresponding to each of the lower electrodes 410-1 to 410-748 described later in the manufacturing process is formed.

As illustrated in FIGS. 6A and 6C, the lower electrodes 410-1 to 410-748 (cathodes) are a plurality of electrodes formed in layers (first electrode layers) on the silicon substrate 402. Each of the lower electrodes 410-1 to 410-748 is formed on a plurality of driving portions built in the silicon substrate 402 by using a Si integrated circuit processing technique together with a manufacturing process of manufacturing the silicon substrate 402. The lower electrodes 410-1 to 410-748 can be made of a metal having a high reflectance with respect to an emission wavelength of the light emitting layer 450 described later. Therefore, the lower electrodes 410-1 to 410-748 can contain silver (Ag), aluminum (Al), an alloy thereof, a silver-magnesium alloy, or the like.

Figure 6B:
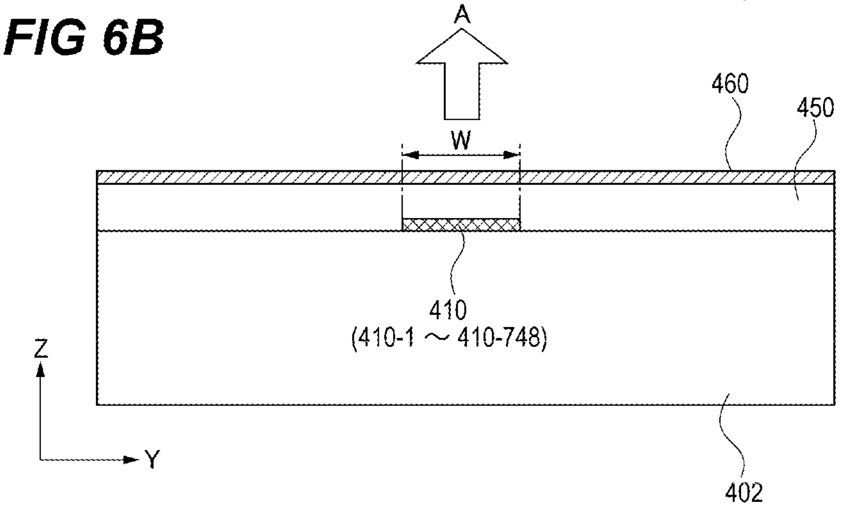
Figure 6C:
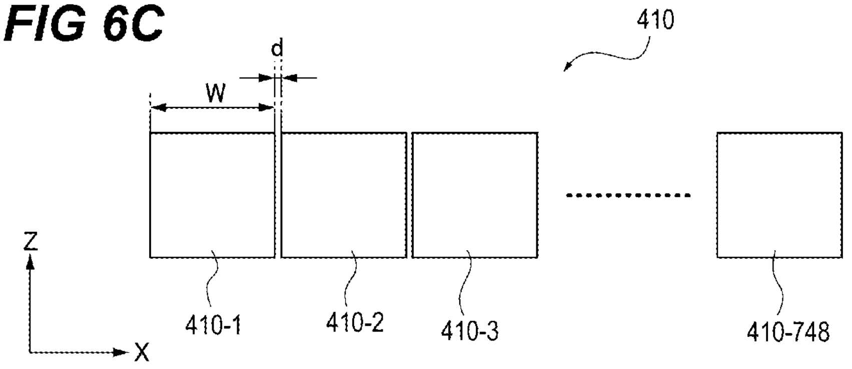

As illustrated in FIGS. 6A to 6C, the lower electrodes 410-1 to 410-748 are electrodes provided corresponding to the respective pixels in the X direction. That is, each of the lower electrodes 410-1 to 410-748 is an electrode provided to form one pixel. The lower electrodes 410-1 to 410-748 are referred to as a first electrode array. The lower electrodes 410-1 to 410-748 forming the first electrode array are arranged along the rotational axis direction of the photosensitive drum 103. Here, the lower electrodes 410-1 to 410-748 may be arranged so as to be inclined by about ±1° with respect to the rotational axis direction of the photosensitive drum 103. Strictly parallel to the rotational axis direction of the photosensitive drum 103 is not required.

A width W of each of the lower electrodes 410-1 to 410-748 in the X direction is a width corresponding to the width of one pixel. An interval d is a distance (arrangement interval) between the lower electrodes in the X direction. Since the lower electrodes 410-1 to 410-748 are formed at the interval d on the silicon substrate 402, the plurality of driving portions formed on the silicon substrate 402 can individually control the voltages of the lower electrodes 410-1 to 410-748. The interval d is filled with the organic material of the light emitting layer 450, and the lower electrode is partitioned by the organic material. The light emitting layer 450 is also referred to as a light emitting portion.

Note that the shape of the lower electrode 410 is not limited to a square, and may be a quadrangular or more polygonal shape, a circular shape, an elliptical shape, or the like as long as light having an exposure region size corresponding to the output resolution of the image forming apparatus is emitted and the image quality of the output image satisfies the design specifications of the image forming apparatus by the light.

Next, the light emitting layer 450 will be described. The light emitting layer 450 is formed by being laminated on the silicon substrate 402 on which the lower electrodes 410-1 to 410-748 are formed. That is, the light emitting layer 450 is laminated on the lower electrodes 410-1 to 410-748 at the portions where the lower electrodes 410-1 to 410-748 are formed. The light emitting layer is laminated on the silicon substrate 402 in a portion where the lower electrodes 410-1 to 410-748 are not formed. In this example, the light emitting layer 450 is formed so as to extend over all of the lower electrodes 410-1 to 410-748, but the embodiment is not limited thereto. For example, similarly to the lower electrodes 410-1 to 410-748, the light emitting layer 450 may be formed so as to be separated and laminated on each lower electrode. Alternatively, the lower electrodes 410-1 to 410-748 may be divided into a plurality of groups, and one light emitting layer may be laminated on the lower electrode belonging to each of the divided groups.

As the light emitting layer 450, for example, an organic material can be used. The light emitting layer 450 which is an organic EL film is a laminated structure including functional layers such as an electron transport layer, a hole transport layer, an electron injection layer, a hole injection layer, an electron blocking layer, and a hole blocking layer. For the light emitting layer 450, an inorganic material may be used in addition to the organic material.

The upper electrode 460 (anode) is laminated (second electrode layer) on the light emitting layer 450. The upper electrode 460 is an electrode capable of transmitting light having an emission wavelength of the light emitting layer 450. Therefore, the upper electrode 460 in this example employs a material containing indium tin oxide (ITO) as a transparent electrode. An electrode of indium tin oxide has a transmittance of 80% or more with respect to light in a visible light region, and thus is suitable as an electrode of organic EL.

The upper electrode 460 is formed on the opposite side of the lower electrodes 410-1 to 410-748 with at least the light emitting layer 450 interposed therebetween. That is, the light emitting layer 450 is disposed between the upper electrode 460 and the lower electrodes 410-1 to 410-748 in the Z direction. When the lower electrodes 410-1 to 410-748 are projected onto the upper electrode 460 in the Z direction, the region where the lower electrodes 410-1 to 410-748 are formed falls within the region where the upper electrode 460 is formed. The transparent electrode may not be laminated on the entire light emitting layer 450. However, in order to efficiently emit light from the light emitting layer 450, an occupancy area of the upper electrode 460 is preferably 100% or more, more preferably 120% or more with respect to an occupancy area of one pixel. An upper limit value of the occupied area of the upper electrode 460 is arbitrarily designed by the areas of the silicon substrate 402 and the light emitting layer 450. A wire may be provided except for a portion that transmits light in the upper electrode 460.

The drive circuit controls a potential of each of the lower electrodes 410-1 to 410-748 based on the image data in order to generate a potential difference between the upper electrode 460 and any of the lower electrodes 410-1 to 410-748.

An example of the substrate 502 including the OLED described above is a so-called top emission type device. When a voltage is applied to each of the upper electrode 460 as a positive electrode and the lower electrode 410 as a negative electrode to generate a potential difference therebetween, electrons flow into the light emitting layer 450 from the negative electrode, and holes flow into the light emitting layer 450 from the positive electrode. Then, the light emitting layer 450 emits light by recombination of electrons and holes in the light emitting layer 450. Light directed to the upper electrode 460 by light emission of the light emitting layer 450 is transmitted through the upper electrode 460 and emitted from the substrate 502 in a direction of an arrow A illustrated in FIGS. 6A to 6C. In addition, light from the light emitting layer 450 toward the lower electrode 410 is reflected by the lower electrode 410 toward the upper electrode 460, and the reflected light is also transmitted through the upper electrode 460 and emitted from the substrate 502. There is a time difference in emission timing from the upper electrode 460 between light directly emitted from the light emitting layer 450 toward the upper electrode 460 and light reflected by each of the lower electrodes 410 and emitted from the upper electrode 460. However, since the thickness of the layer of the substrate 502 is extremely small, it can be regarded as substantially simultaneous emission.

By using a transparent electrode such as indium tin oxide as the upper electrode 460, an aperture ratio indicating the light transmission ratio of the electrode can be made substantially equal to the transmittance of the upper electrode 460. That is, since there is substantially no portion that attenuates light or shields light other than the upper electrode 460, light emission of the light emitting layer 450 is attenuated as much as possible or becomes emitted light without being shielded.

When a light emitting material weak against moisture, such as an organic EL layer or an inorganic EL layer, is used as the light emitting layer 450, it is desirable to perform sealing in order to prevent moisture from entering the light emitting region 604. As a sealing method, for example, a single or laminated sealing film of thin films such as silicon oxides, silicon nitrides, and aluminum oxides is formed. As a method for forming the sealing film, a method excellent in covering performance of a structure such as a step can be used, and for example, an atomic layer deposition method (ALD method) or the like can be used.

As described above, when the OLED is used as a light source that emits light for exposing the photosensitive drum 103, the upper electrode 460 is formed on the light emitting layer 450. The "light exit surface" of the substrate 502 means a surface on a side where the upper electrode 460 is formed among surfaces of the substrate 502. That is, a surface of the substrate 502 on a side from which light is emitted from the OLED is defined as a "light exit surface of the light emitting portion".

Figure 7A:
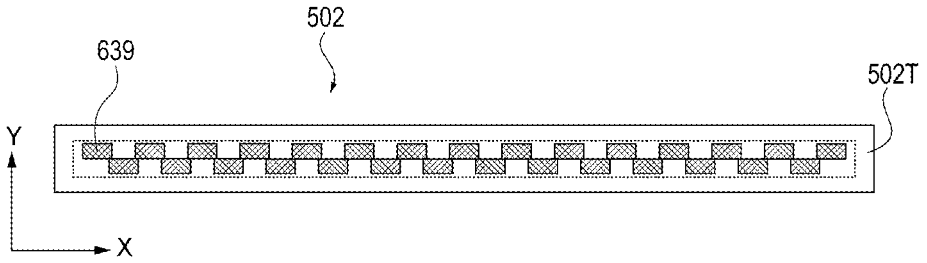
FIGS. 7A and 7B are views for describing a light exit surface and a mounting surface of the substrate.
Figure 7B:
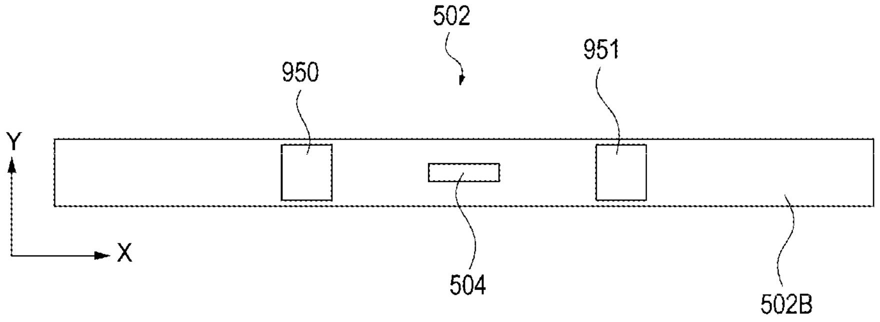

The substrate 502 using the LED 503 that is not the organic EL as the light source will be described again as an example. FIGS. 7A and 7B are views for describing the substrate 502 using the LED 503 as a light source.

FIG. 7A is a view of the light exit surface 502T of the substrate 502 as viewed along a direction perpendicular to the light exit surface 502T. In the drawing, the Y direction is the lateral direction of the substrate 502, and the X direction is the longitudinal direction of the substrate 502. The LED chips 639 are arranged along the longitudinal direction of the substrate 502.

The "light exit surface" is a side of the substrate 502 on which the photosensitive drum 103 is disposed, and can also be said to be a surface including the LED 503 (light emitting portion).

The width of the substrate 502 in the lateral direction can be 5 mm or more and 10 mm or less. In order to expose the photosensitive drum 103, it is necessary to bring the exposure head 105 close to the photosensitive drum 103. However, since the charging device 104 and the developing unit 641 exist in the vicinity of the photosensitive drum 103, it is necessary to increase the size of the image forming apparatus 1 itself in order to secure a sufficient space. Therefore, the width of the substrate 502 can be designed to be 10 mm or less.

Meanwhile, it is necessary to provide a wire for driving the LED chip 639 and a space for mounting electronic components 950 and 951 described later on the substrate 502. Therefore, even when the width of the substrate 502 in the lateral direction is narrowed, a width of about 5 mm is required.

FIG. 7B is a view for describing a mounting surface 502B which is a back surface of the substrate 502. Electronic components 950 and 951 for driving the LED chip 639 are provided on the mounting surface 502B. Examples of the electronic components 950 and 951 include a driver integrated circuit (IC). In the present embodiment, a connector 504 is provided between the electronic components 950 and 951. Power is supplied to the electronic components 950 and 951 via the connector 504. In addition, it is not preferable to provide the electronic component 950 (951) and a wiring pattern in the vicinity of the end portion of the substrate 502 even in consideration of stability at the time of mass production of the substrate 502 and stability of quality. Therefore, it is possible to provide a space of about 1 to 2 mm in a region from the electronic component 950 (951) or the wiring pattern to the end portion of the substrate 502. Overall, a width of the substrate 502 in the lateral direction can be 5 mm or more.

(Detailed Configuration of Exposure Head)

Figure 8:
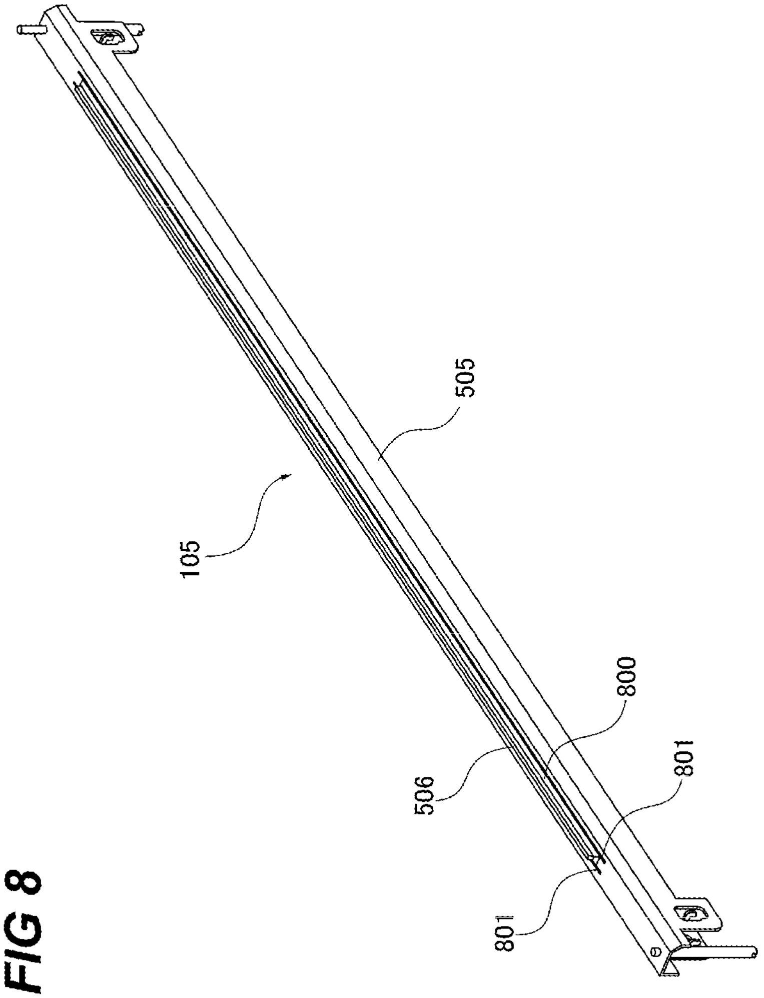
FIG. 8 is a perspective view of an exposure head.
Figure 9:
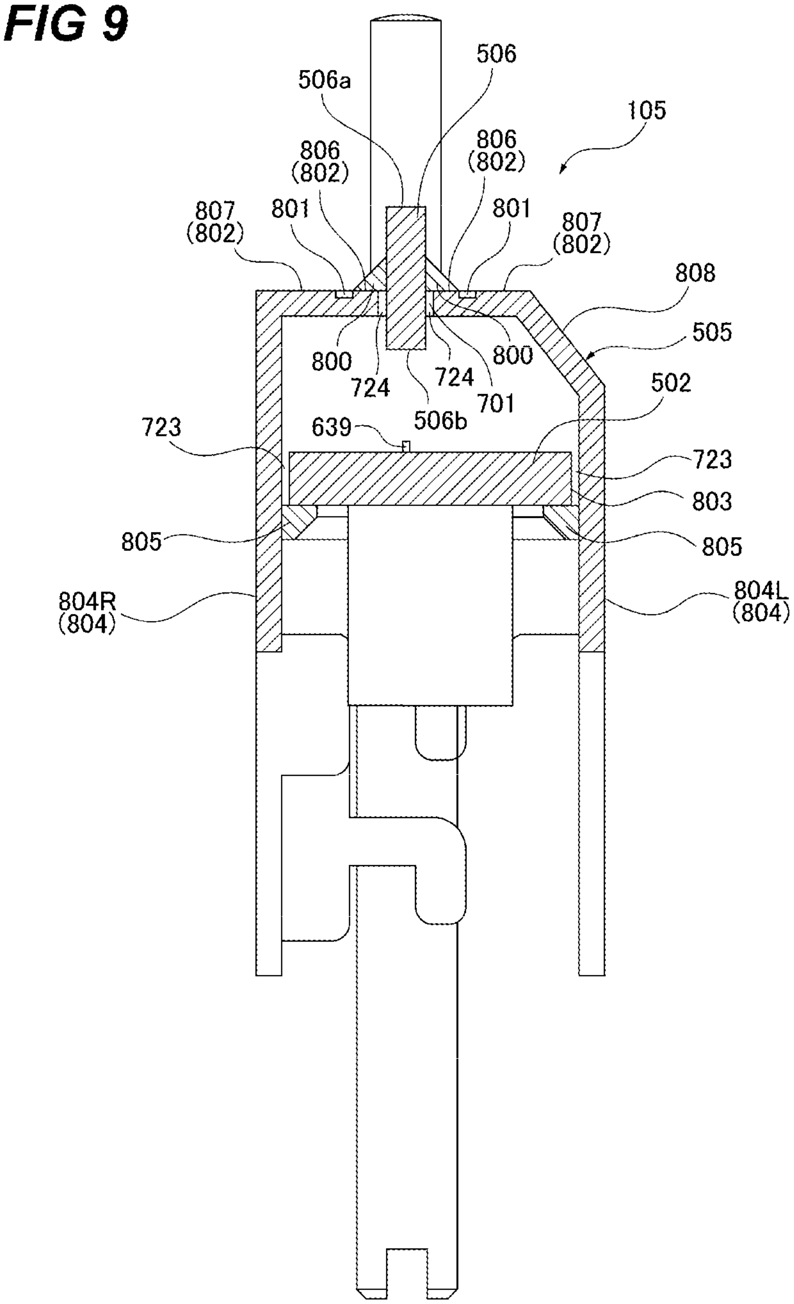
FIG. 9 is a cross-sectional view of an exposure head illustrating a positional relationship between a holder and components around the lens array.

Next, a detailed configuration of the exposure head 105 will be described. FIG. 8 is a schematic perspective view of the exposure head 105 included in the image forming apparatus 1 of the present embodiment. FIG. 9 is a cross-sectional view of the exposure head 105 illustrating a positional relationship between the holding member 505 and components around the lens array 506.

As described above, the exposure head 105 has an elongated shape (longitudinal shape) extending in the rotational axis direction of the photosensitive drum 103. Furthermore, the exposure head 105 includes the holding member 505, the lens array 506, and the substrate 502.

The holding member 505 is made of metal as described above. For example, the holding member 505 is formed by pressing a sheet metal such as an iron thin plate into a U shape. Hereinafter, the shape of the holding member 505 will be described.

(Shape of Holding Member)

As illustrated in FIGS. 8 and 9, the holding member 505 has a flat surface portion (opposing surface) 802 in which the first opening 701 into which the lens array 506 is inserted is formed. The flat surface portion 802 faces the photosensitive drum 103 in the optical axis direction of the lens of the lens array 506. Note that the flat surface portion 802 is not limited to a flat surface, and may be a slightly curved surface. In addition, the holding member 505 has an extending portion 804R extending in a direction away from the photosensitive drum 103 from one side in the lateral direction of the flat surface portion 802. In addition, the holding member 505 has an extending portion 804L extending in a direction away from the photosensitive drum 103 from the other side in the lateral direction of the flat surface portion 802. Further, in the holding member 505, the flat surface portion 802 and the extending portion 804L are connected by a connecting portion 808 on the charging device side (the other side in the lateral direction). The connecting portion 808 is an inclined surface that intersects the flat surface portion 802 and the substrate support portion 804R between the flat surface portion 802 and the substrate support portion 804R, and is provided in a direction away from the charging device 104. The extending portion 804R and the extending portion 804L form a substrate support portion 804 for supporting the substrate 502 inserted from the second opening 803 in the holding member 505. The flat surface portion 802, the substrate support portion 804 (804R, 804L), and the connecting portion 808 are integrated, form a holding member 505 that holds the lens array 506 and the substrate 502, and are formed in a substantially U shape. Since the holding member 505 is formed in a substantially U shape, the second opening 803 is formed on the side opposite to the flat surface portion 802. The second opening 803 is formed between the substrate support portions 804 (extending portions 804L and 804R) extending from the flat surface portion 802 to the side away from the photosensitive drum.

The substrate 502 is inserted from the second opening 803, that is, inserted from the lower side of the U-shaped holding member 505, and bonded to the inside of each substrate support portion 804 (the inside of the extending portion 804L and the inside of the extending portion 804R) with an adhesive. Since the position of the substrate 502 in an in-focus direction is determined by a jig (not illustrated), the exposure head 105 does not include a positioning unit in the in-focus direction of the substrate 502.

In addition, the lens array 506 is also adhered to the flat surface portion 802 with an adhesive in a state of being inserted into the first opening 701 formed in the flat surface portion 802. Note that the lens array 506 is fixed to the flat surface portion 802 (holding member 505) after the position and inclination in the in-focus direction are adjusted by a jig such that the distance in the in-focus direction between all the LED chips 639 mounted on the substrate 502 and the lens array 506 becomes a predetermined value. The lens array 506 is fixed to the flat surface portion 802 at a plurality of locations in the longitudinal direction with an adhesive. That is, the exposure head of the present embodiment has a plurality of bonding places for bonding and fixing the lens array 506 inserted into the first opening 701 to the flat surface portion 802 in the longitudinal direction of the flat surface portion 802.

As described above, the substrate 502 and the lens array 506 are held by the holding member 505, and thus, the LED 503 and the incident surface 506*b* of the lens array 506 face each other. The light emitted from the LED 503 is incident on the incident surface 506*b*, and is emitted from the exit surface 506*a* toward the photosensitive drum 103.

The holding member 505 holds the substrate 502 inside the pair of substrate support portions 804 and 804 (extending portions 804R and 804L). Therefore, as illustrated in FIG. 9, an interval W0 between the substrate support portion 804R and the substrate support portion 804L, in other words, an interval (distance) W0 between the pair of substrate support portions 804R and 804L is wider than the width of the substrate 502 in the lateral direction of the substrate 502.

After the positions of the substrate 502 and the lens array 506 are adjusted and fixed to the holding member 505, a gap 723 between the substrate support portion 804 and the substrate 502 is sealed in the longitudinal direction by a sealing agent 800. Similarly, the sealing agent 800 is applied to a gap 724 between the lens array 506 inserted into the first opening 701 and the flat surface portion 802, and thus, the gap 724 is sealed in the longitudinal direction by the sealing agent 800. More specifically, the sealing agent 800 seals the gap between the side wall of the lens array 506 and the edge of the first opening 701 along the longitudinal direction of the holding member 505. As a result, it is possible to reduce the possibility that dust such as toner flows in from the gap between the side wall of the lens array 506 and the first opening 701 and the light emitted from the LED 503 is blocked by the dust. Note that, as a matter of course, the gap sealed by the sealing agent 800 seals not only the gap between the side wall on one side of the lens array 506 and the edge of the first opening 701, but also the gap between the side wall on the other side of the lens array 506 and the edge of the first opening 701. The side wall on the other side of the lens array 506 refers to a side wall opposite to the side wall on one side of the lens array 506.

Figure 10:
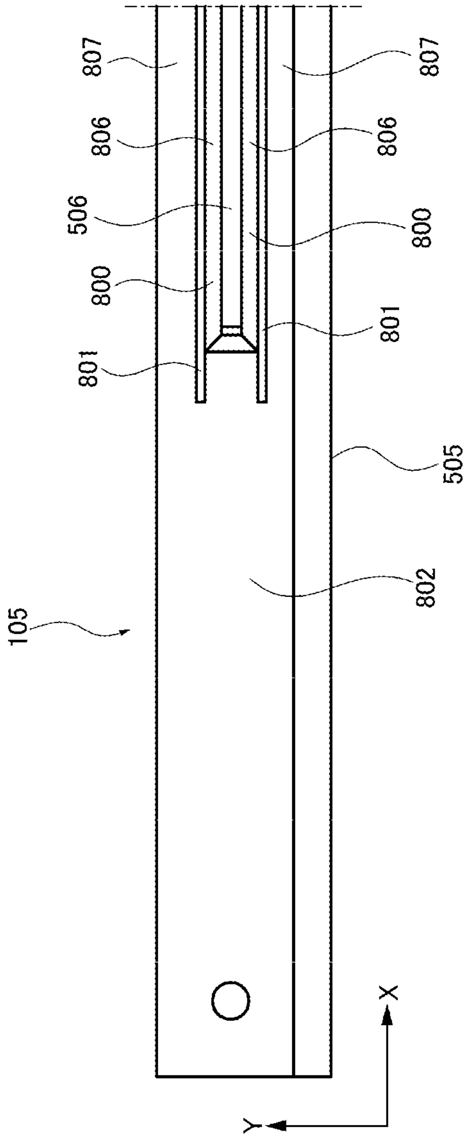
FIG. 10 is a top view of the exposure head illustrating a positional relationship between the lens array and a sealing agent damming portion.

Furthermore, as illustrated in FIGS. 9 and 10, the holding member 505 includes a damming portion 801 for damming the sealing agent 800 applied to the gap 724 between the lens array 506 inserted into the first opening 701 and the flat surface portion 802. FIG. 10 is a view illustrating an upper surface portion of the exposure head 105 illustrating a positional relationship between the lens array 506 and the damming portion 801. In FIG. 10, the X direction is the longitudinal direction of the flat surface portion 802, and the Y direction is the lateral direction orthogonal to the longitudinal direction of the flat surface portion 802. The damming portion 801 is provided on the flat surface portion 802 and is provided along the longitudinal direction of the first opening 701. The damming portions 801 are provided on both sides of the first opening 701 in the lateral direction orthogonal to the longitudinal direction of the flat surface portion 802. In the lateral direction of the flat surface portion 802, the damming portion 801 separates the flat surface portion 802 into a first flat surface portion 806 continuous with the edge of the first opening 701 and a second flat surface portion 807 in which the first flat surface portion 806 is interposed between the second flat surface portion and the edge of the first opening 701. That is, the first flat surface portion 802 forms an edge of the first opening 701. As illustrated in FIG. 9, the first flat surface portion 806 and the second flat surface portion 807 are on the same plane. The damming portion 801 is a so-called groove formed in the flat surface portion 802. In the lateral direction of the flat surface portion 802, the first flat surface portion 806 is disposed between the first opening 701 and the second flat surface portion 807.

The damming portion 801 is a recessed groove that forms a step with the first flat surface portion (application region) 806 in the lateral direction of the flat surface portion 802. The recessed shape of the damming portion 801 is formed by engraving. More specifically, the recessed shape of the damming portion 801 is formed by performing an imprinting step when the holding member 505 is pressed. The method of forming the engraved mark is, for example, a method of irradiating laser light. By irradiating the sheet metal with a laser beam, a thin groove is formed along the longitudinal direction of the lens array 506. As in the example of the present embodiment, the width of the groove formed in this manner is much narrower than the width of the lens array 506. Note that the width of the lens array 506 here refers to the width of the lens array 506 in a direction perpendicular to the longitudinal direction of the holding member 505 and the optical axis direction of the lens of the lens array 506.

However, the width of the groove of the damming portion 801 may be wider than the width of the lens array 506. In this way, it is possible to impart a function of storing the sealing agent 800 in the damming portion 801. That is, it is possible to store the sealing agent 800 in a case where the width of the damming portion 801 is wider than in a case where the width is narrower.

However, in order to form a groove having a wide width, it is necessary to repeatedly perform irradiation when laser light is emitted, and it takes time to assemble. An increase in assembly time also leads to an increase in product cost. That is, from the viewpoint of product cost, the width of the damming portion 801 can be narrowed.

As described above, the damming portions 801 are provided on both sides of the first opening 701 in the lateral direction orthogonal to the longitudinal direction of the flat surface portion 802. As illustrated in FIG. 9, the damming portion 801 separates the flat surface portion 802 into the first flat surface portion 806 and the second flat surface portion 807 such that the first flat surface portion 806 is interposed between the first opening 701 and the second flat surface portion 807 in the lateral direction of the flat surface portion 802. Therefore, the sealing agent 800 applied to the gap 724 between the lens array 506 inserted into the first opening 701 and the flat surface portion 802 is dammed by the damming portion 801 as follows.

The applied sealing agent 800 flows from the side surface of the lens array 506 in the lateral direction toward the outside of the holding member 505 in the lateral direction until the surface is cured in the lateral direction of the flat surface portion 802. However, the sealing agent 800 is dammed by the first flat surface portion 806 provided between the first opening 701 and the damming portion 801 and the concave damming portion 801, and prevents flowing out to the second flat surface portion 807 provided outside the damming portion 801. Specifically, there is first damming due to surface tension of the sealing agent 800 at a step between the first flat surface portion 806 and the damming portion 801. Furthermore, in a case where the sealing agent 800 is not dammed even by the first damming, the sealing agent 800 is deposited in a concave shape of the damming portion 801 to function as second damming.

The sealing agent 800 applied to the gap 724 flows from the end surface in the longitudinal direction of the lens array 506 toward the outside in the longitudinal direction of the holding member 505 until the surface is cured in the longitudinal direction of the flat surface portion 802. When a length of the damming portion 801 in the longitudinal direction is equal to or less than that of the lens array 506, there is a possibility that the sealing agent 800 flowing in the longitudinal direction goes around the damming portion 801 and flows out to the second flat surface portion 807. Therefore, in the present embodiment, as illustrated in FIG. 10, the damming portion 801 is provided to be longer to the outside in the longitudinal direction than the first opening 701 in the longitudinal direction of the flat surface portion 802. As a result, the sealing agent 800 flowing in the longitudinal direction is dammed by the damming portion 801, and can be prevented from flowing out to the second flat surface portion 807 provided outside the damming portion 801.

Note that the damming portion 801 merely reduces the outflow of the sealing agent 800, and may slightly flow out. That is, the sealing agent 800 is not necessarily deposited only between the damming portion 801 and the side wall of the lens array 506.

As described above, the damming portion 801 having the above configuration can be easily formed by performing an engraving process when the holding member 505 is pressed. When the holding member 505 made of metal (for example, a steel plate) is provided with an inclined shape around the lens array similarly to the holding member made of resin, bending or drawing in a narrow region is required, and the dimensional accuracy of the holding member 505 is significantly deteriorated. On the other hand, the damming portion 801 of the present embodiment can obtain a sufficient effect even with a shallow engraving having a depth of, for example, about 0.2 mm. Therefore, it is possible to suppress the influence on the dimensional accuracy of the holding member 505 as compared with the configuration in which the above-described inclined shape is provided. Further, in the damming portion 801, the width (length in the lateral direction) of the flat surface portion 802 is 0.5 mm or less. Even when the width of the damming portion 801 is 0.5 mm or less, the damming portion sufficiently functions, so that the width of the holding member 505 can be narrowed as compared with the case of forming the damming portion by bending or drawing, and the image forming apparatus can be downsized.

Figure 11:
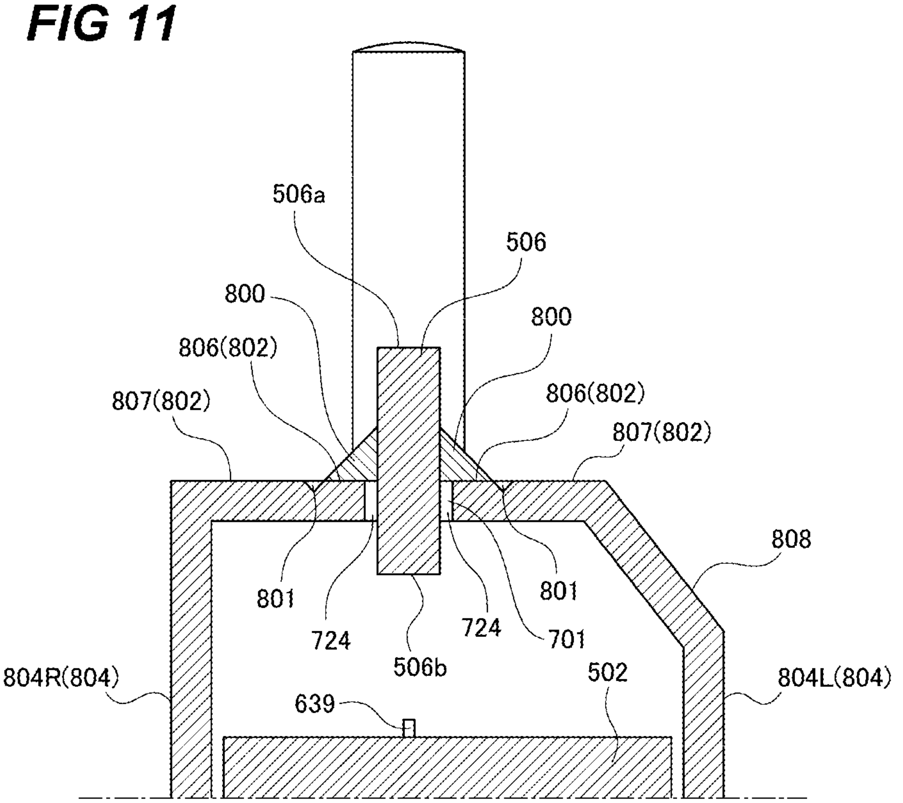
FIG. 11 is a cross-sectional view of the exposure head illustrating a cross-sectional shape of the sealing agent damming portion.
Figure 12:
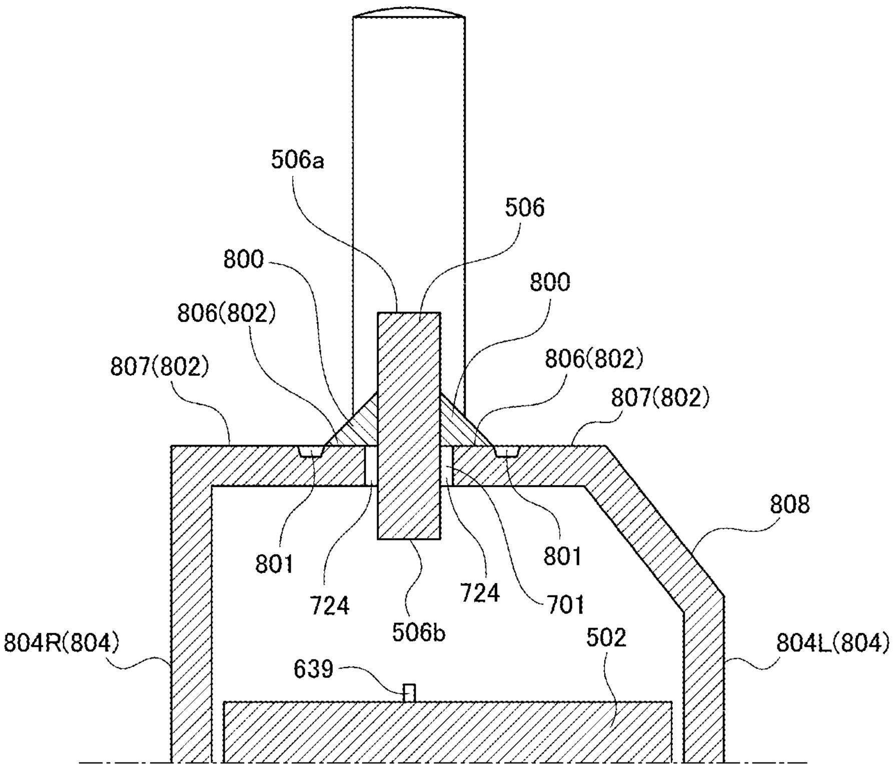
FIG. 12 is a cross-sectional view of the exposure head illustrating the cross-sectional shape of the sealing agent damming portion.

In the present embodiment, the recessed shape of the damming portion 801 illustrated in FIG. 9 is rectangular, but other shapes may be used as long as a step is formed between the first flat surface portion 806 and the damming portion 801, and the recessed shape functions as a deposited portion of the sealing agent. The recessed shape of the damming portion 801 may be, for example, a V-shape as illustrated in FIG. 11 or a trapezoidal shape as illustrated in FIG. 12. With such a configuration, a similar effect can be obtained.

Figure 13:
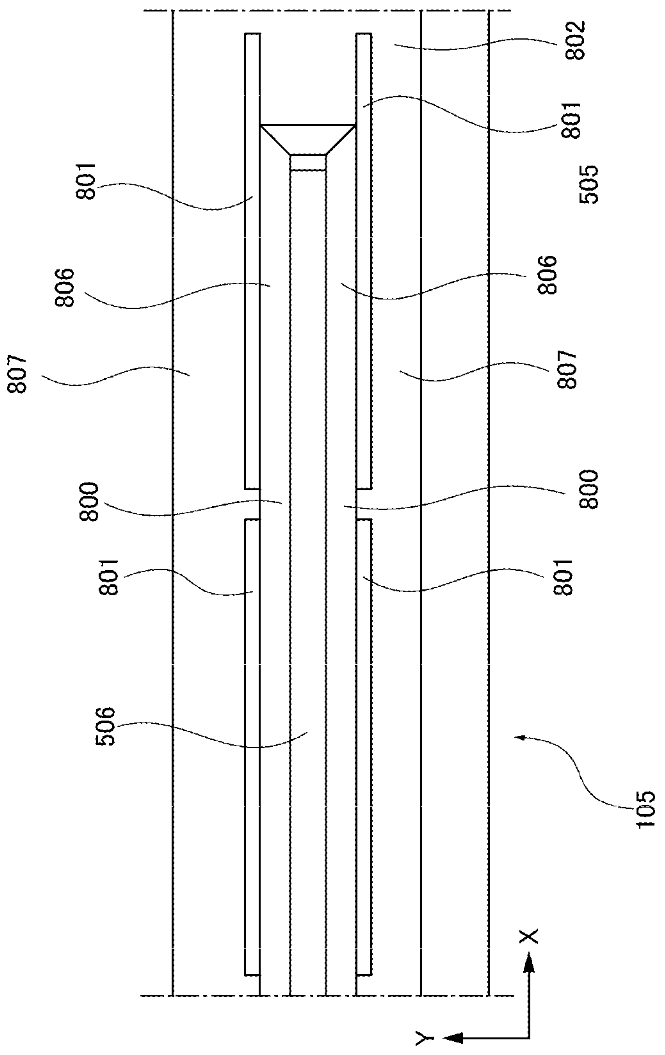
FIG. 13 is a top view of an exposure head illustrating an example of a shape of the sealing agent damming portion.

In the present embodiment, the damming portion 801 is continuously provided in the longitudinal direction of the holding member 505 as illustrated in FIG. 10, but the present invention is not limited thereto. For example, as illustrated in FIG. 13, the damming portion 801 may be intermittently provided. In this case, in a region between the damming portion 801 and the damming portion 801 in the longitudinal direction of the holding member 505, the flow amount of the sealing agent 800 flowing from the side surface of the lens array 506 toward the outside in the lateral direction of the holding member 505 is restricted to some extent by the damming action by the damming portions 801 on both sides in the longitudinal direction of the region and the surface tension with the sealing agent 800 in the region. There is no problem as long as the flow amount of the sealing agent falls within the width of the damming portion 801 or less.

Figure 14:
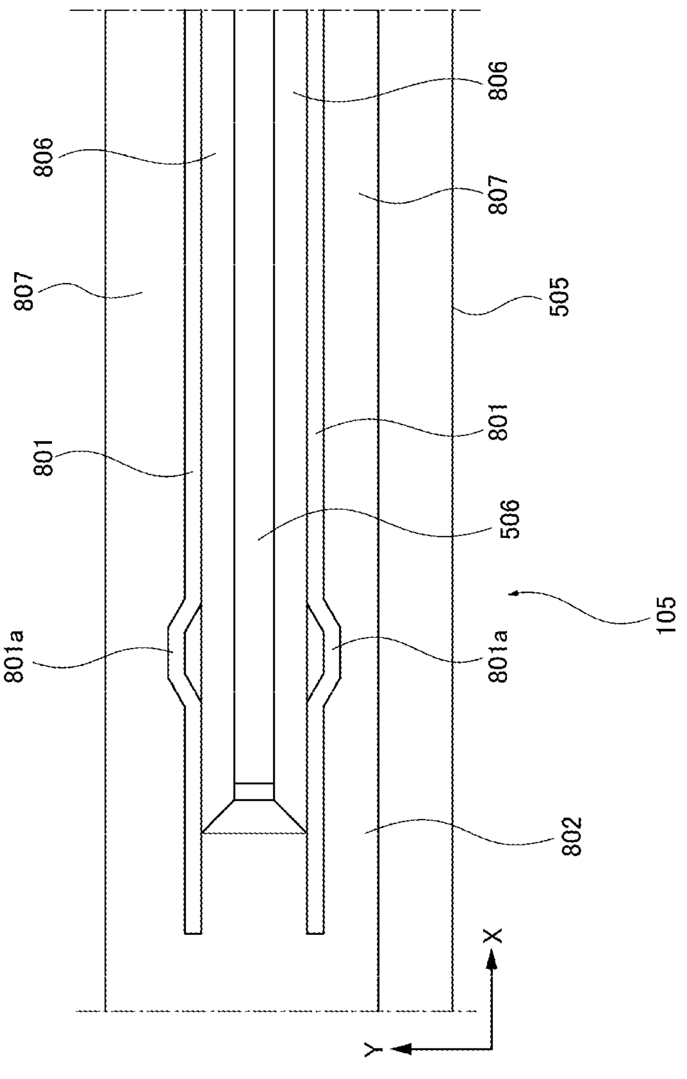
FIG. 14 is a top view of an exposure head illustrating an example of the shape of the sealing agent damming portion.

In the present embodiment, the damming portion 801 is provided linearly in the longitudinal direction of the holding member 505, but the present invention is not limited thereto. For example, in a case where a plurality of bonding locations for bonding and fixing the lens array 506 to the holding member is provided in the longitudinal direction of the flat surface portion 802, it is expected that the sealing agent 800 applied to the bonding locations protrudes in the lateral direction of the exposure head 105 as compared with a portion other than the bonding locations. At such a bonding location, as long as the width of the second flat surface portion 807 can be secured, the damming portion 801 may have a shape protruding only at the bonding location in the lateral direction of the holding member 505 as illustrated in FIG. 14. That is, the damming portion 801 may be provided with a projecting portion 801*a* in which the region of the bonding location is wider in a direction away from the first opening 701 than a region other than the bonding location in the lateral direction of the flat surface portion 802. By providing the projecting portion 801*a* in the region of the bonding portion in this manner, it is possible to prevent the sealing agent 800 applied to the gap 724 from flowing out to the second flat surface portion 807 in the holding member 505 even in the region of the bonding location.

(Positional Relationship Between Cleaning Mechanism and Exposure Head)

As described above, when foreign matter such as toner adheres to the exit surface of the lens array 506, the light emitted from the light emitting element is partially shielded, and the image quality of the output image is deteriorated. Therefore, it is necessary to periodically clean the exit surface of the lens array 506. In the present embodiment, the image forming apparatus includes a cleaning rod 900 as a cleaning unit for cleaning the lens array 506 of the exposure head 105. Details of the cleaning rod 900 that cleans the lens array 506 will be described.

Figure 15:
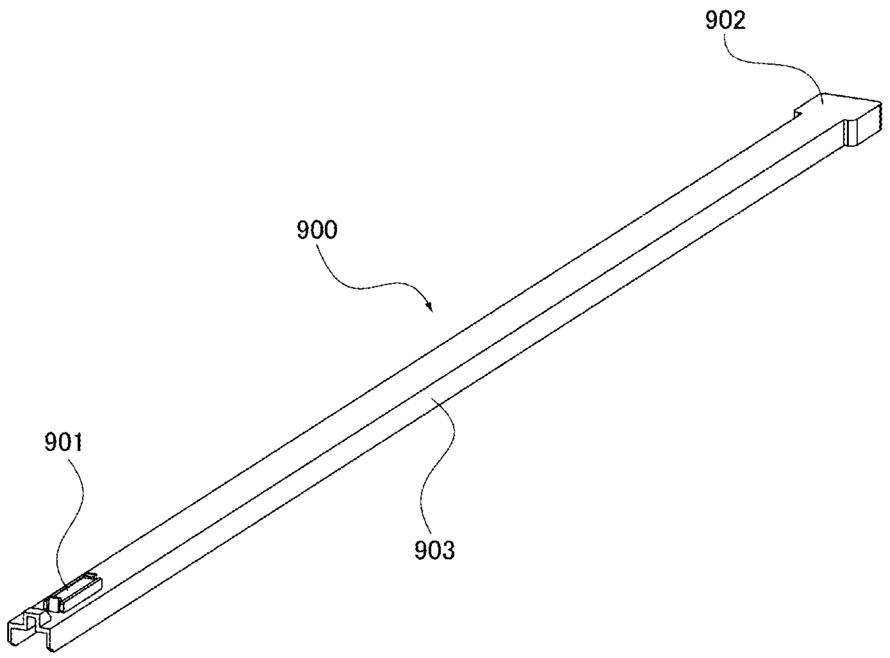
FIG. 15 is a perspective view of a cleaning rod.

FIG. 15 is a perspective view of the cleaning rod 900. The cleaning rod 900 has a rod shape elongated in the longitudinal direction as a whole. The cleaning rod 900 includes a grip portion 902 at one end of a bar-shaped body portion 903 having a U-shaped cross section, and includes a cleaning portion 901 at the other end. Although the cleaning portion 901, the grip portion 902, and the body portion 903 are illustrated as an integral body, they may be configured as separate bodies that are detachable. In addition, the cleaning rod 900 may be provided in, for example, a cover member (not illustrated) in the image forming apparatus, but may be prepared outside the image forming apparatus and used when cleaning is required.

Figure 16:
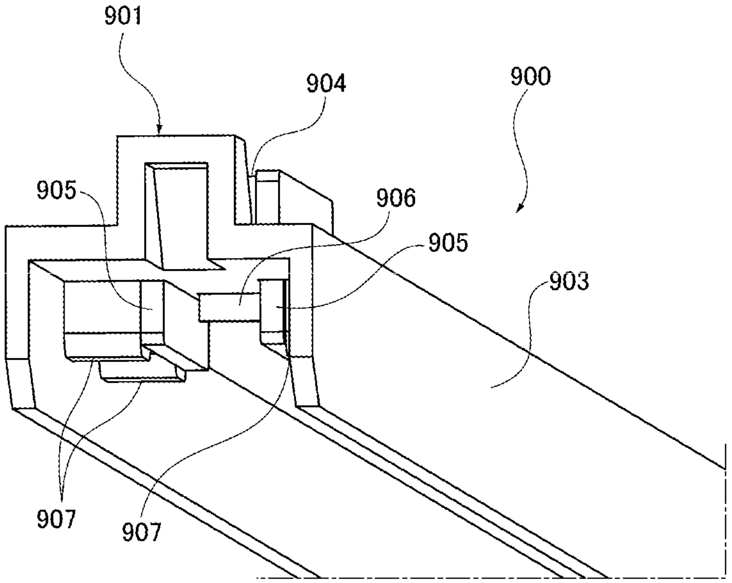
FIG. 16 is a perspective view illustrating a cleaning portion of the cleaning rod.

FIG. 16 is an enlarged perspective view of the cleaning portion 901. The cleaning rod 900 for cleaning the exposure head 105 includes a cleaning portion 901 that comes into contact with and cleans the surface of the lens array. Here, the cleaning portion 901 includes a cleaning blade 906 that comes into contact with the surface of the lens array 506 to clean the surface. Further, the cleaning rod 900 includes a seating surface 907 which is a contact portion that comes into contact with the second flat surface portion 807 of the holding member 505 to regulate the position (entry amount) of the cleaning portion 901 with respect to the surface (exit surface) of the lens array 506. Note that a portion of the flat surface portion 802 on which the seating surface 907 abuts corresponds to the contacting surface. That is, the damming portion 801 is formed between the first opening 701 and the contacting surface of the flat surface portion 802. In addition, the sealing agent 800 is applied between the side wall of the lens array 506 and the damming portion 801. This reduces the possibility that the sealing agent 800 flows out to the contacting surface. The "contacting surface" referred to herein may be not only a flat surface but also, for example, a slightly curved surface.

A magnet 904 is fixed to the tip of the body portion 903 of the cleaning rod 900, and yokes 905 for concentrating magnetic flux are fitted on both sides thereof. By concentrating the magnetic flux using the yoke 905, a magnetic flux density generated in the magnet 904 can be effectively concentrated, and the magnetic force can be increased. Between the two yokes 905, a cleaning blade 906 as the cleaning portion 901 is provided at a position facing the lens array 506 when the cleaning rod 900 is fitted into the exposure head 105. The cleaning blade 906 is a blade made of urethane rubber having a thickness of 0.5 mm, and one surface of the L shape is bonded to the body portion 903 with a double-sided tape. Note that the thickness and material of the cleaning blade 906 are merely examples, and may be made of silicon rubber or the like. In addition, the cleaning portion 901 is not limited to the blade, and may have a configuration in which a nonwoven fabric is attached to the surface of the sponge to form the cleaning portion.

The seating surface 907 is provided on a side surface of the yoke 905. As described above, the seating surface 907 is a contact portion that comes into contact with the second flat surface portion 807 of the holding member 505 in order to keep the entry amount of the cleaning blade 906 into the lens array 506 constant.

Figure 17:
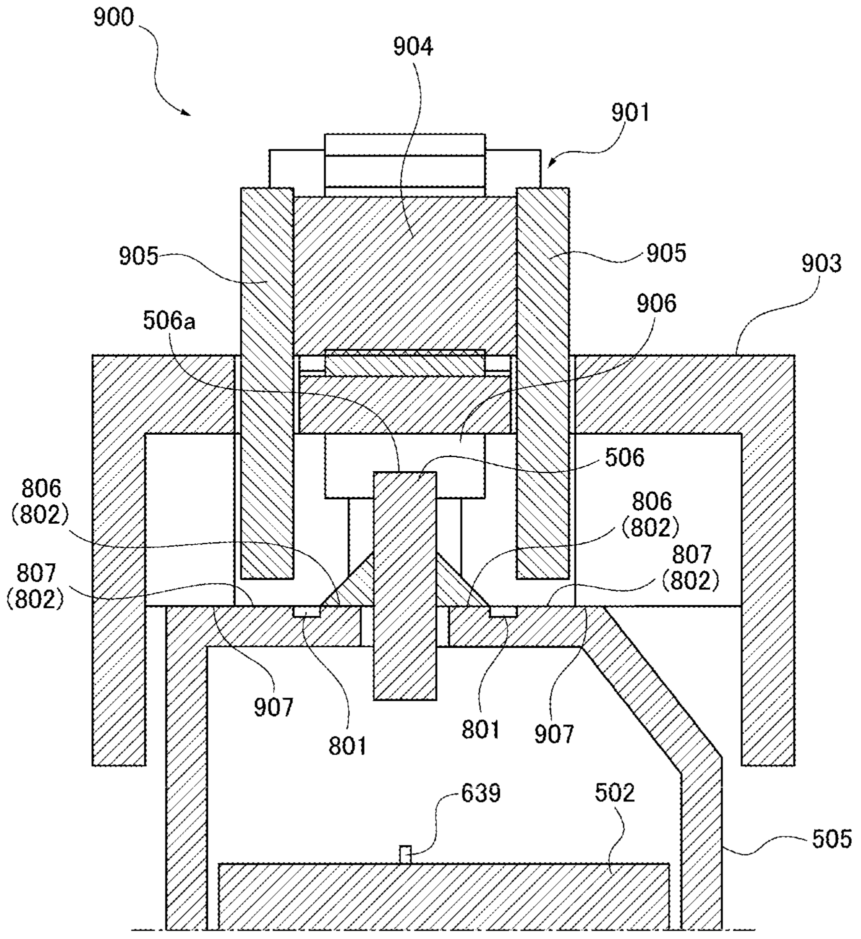
FIG. 17 is a cross-sectional view illustrating a positional relationship between the cleaning rod and the exposure head at the time of cleaning.

FIG. 17 is a cross-sectional view illustrating a positional relationship between the cleaning rod 900 and the exposure head 105 at the time of cleaning. A width of a recessed portion of the body portion 903 having a U-shaped cross section is just fitted to the holding member 505 of the exposure head 105. The cleaning rod 900 is attracted to the exposure head 105 by a magnetic force between the yoke 905 and the holding member 505, and the second flat surface portion 807 of the holding member 505 and the seating surface 907 of the cleaning rod 900 abut against each other. As a result, the entry amount (position) of the cleaning blade 906 into the lens array 506 is kept constant. The cleaning blade 906 is set to interfere with the exit surface 506*a* of the lens array 506. Therefore, when the cleaning rod 900 is slid along the exposure head 105, the tip of the cleaning blade 906 can wipe the exit surface 506*a* of the lens array 506 to remove the foreign matter. The entry amount of the cleaning blade 906 into the lens array 506 is, for example, about 0.5 mm. In order to stably slide the exit surface 506*a* of the lens array 506 while receiving the repulsive force due to interference, it is desirable that the suction force generated between the cleaning portion 901 and the holding member 505 is at least 200 gf or more. The magnet 904 used in the present embodiment uses a ferrite magnet of 6 mm×3 mm×15 mm, and the yoke 905 uses an electrogalvanized steel plate having a contact width with the holding member 505 of 14 mm and a thickness of 1 mm. These combinations generate a vertical attraction force of 500 gf or more. It is important that a magnetic force between the yoke 905 and the holding member 505 generates an adsorption force for adsorbing the cleaning rod 900 to the exposure head 105. Therefore, the magnet 904 in the present embodiment is an example, and for example, the magnet may be a neodymium magnet, a samarium-cobalt magnet, or the like, and the shape and size of the magnet 904 and the yoke 905 are not limited thereto.

Figure 18:
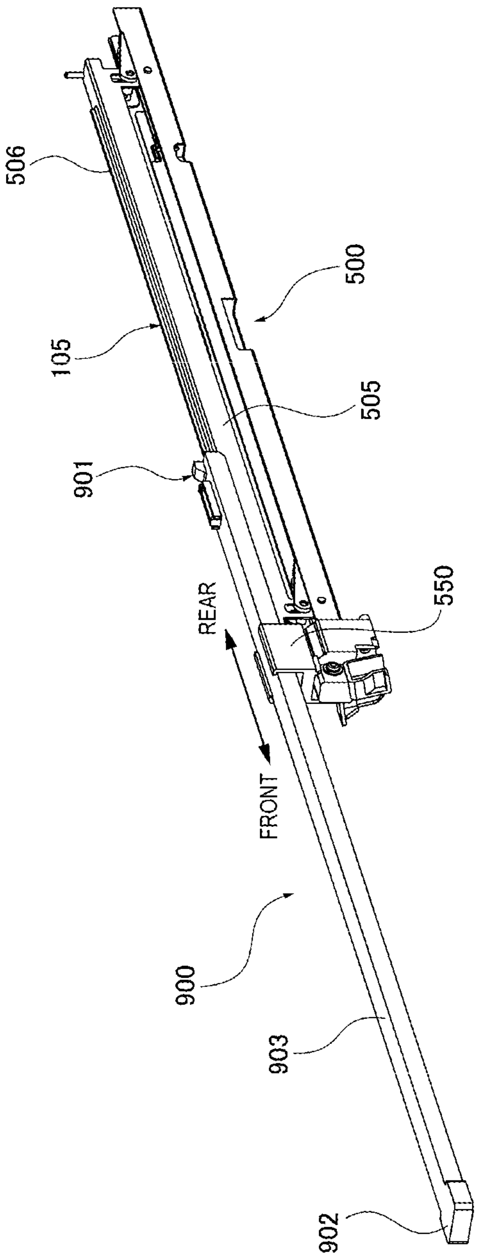
FIG. 18 is a perspective view illustrating a cleaning operation.
Figure 19:
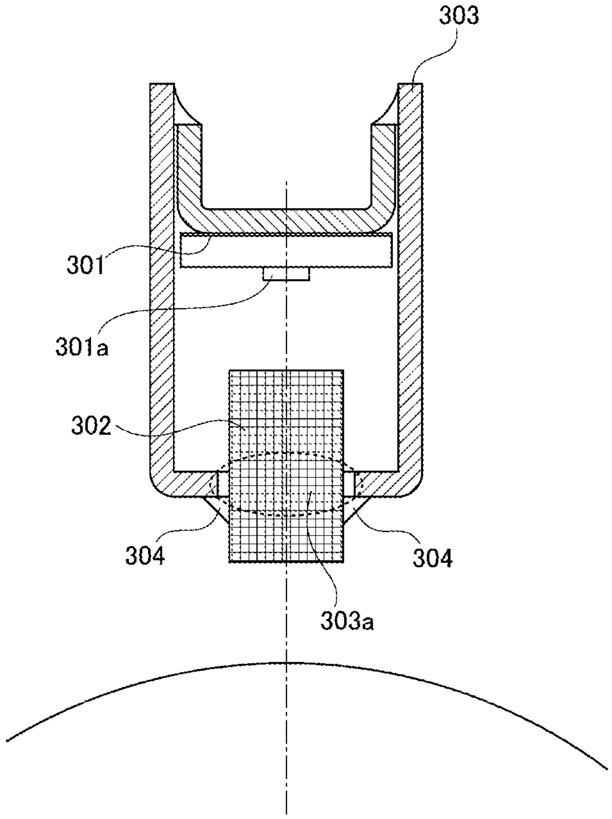
FIG. 19 is a cross-sectional view illustrating a conventional example.

An actual cleaning operation will be described with reference to FIG. 18. When the cover 558 (see FIGS. 2A and 2B) provided on the front surface of the image forming apparatus 1 is opened, the exposure head 105 moves to the retracted position illustrated in FIG. 18, so that the cleaning rod 900 is inserted into the insertion portion 550 of the exposure unit 500. Since the body portion 903 is guided and fitted to the holding member 505 by the insertion portion 550, the cleaning rod 900 is moved in the front-back direction using the holding member 505 as a rail to clean the lens array 506. At this time, even when the cleaning rod 900 is at any position in the longitudinal direction of the exposure head 105, the seating surface 907 of the cleaning rod 900 comes into contact with the second flat surface portion 807 of the holding member 505, and the seating surface 907 does not come into contact with the sealing agent 800.

As described above, according to the present embodiment, the sealing agent 800 applied to the gap 724 between the lens array 506 inserted into the first opening 701 and the flat surface portion 802 is dammed by the damming portion 801, and can be prevented from flowing out to an unintended location in the holding member 505. Specifically, the sealing agent 800 can be prevented from flowing out to the second flat surface portion 807 in the holding member 505. As a result, when the exposure head 105 is cleaned by the cleaning rod 900, the second flat surface portion 807 of the holding member 505 can be used as a portion with which the seating surface 907 of the cleaning rod 900 comes into contact.

Note that, in the above-described embodiment, four image forming portions are used, but the number of used image forming portions is not limited, and may be appropriately set as necessary.

Further, in the above-described embodiment, the printer has been exemplified as the image forming apparatus, but the present invention is not limited thereto. For example, another image forming apparatus such as a copying machine or a facsimile machine, or still another image forming apparatus such as a multifunction peripheral combining these functions may be used. In addition, the image forming apparatus has been exemplified in which an intermediate transfer member is used, toner images of respective colors are transferred onto the intermediate transfer member in a sequentially superimposed manner, and the toner images carried on the intermediate transfer member are collectively transferred to a recording material, but the present invention is not limited thereto. The image forming apparatus may be an image forming apparatus that uses a recording material carrier and transfers toner images of respective colors in a sequentially superimposed manner on the recording material carried on the recording material carrier. Similar effects can be obtained by applying the present invention to exposure heads used in these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-72340, filed Apr. 22, 2021, which is hereby incorporated by reference herein in its entirety.

What is claimed is:

1. An exposure head configured to expose a photoreceptor, the exposure head comprising:

a substrate including a plurality of light emitting portions configured to emit light to expose the photoreceptor;

a lens array including a plurality of lenses configured to condense the light emitted from the plurality of light emitting portions onto the photoreceptor; and a holder configured to hold the substrate and the lens array, wherein the holder includes: (1) an opposing surface including an opening into which the lens array is inserted, the opposing surface being configured to face the photoreceptor in an optical axis direction of the plurality of lenses; (2) a sealing agent configured to seal a gap between a side wall of the lens array and an edge of the opening; and (3) a groove formed in the opposing surface, wherein the sealing agent is applied between the groove and the side wall, wherein the groove includes: (1) a first region that overlaps the lens array when viewed from a shorthand direction that is perpendicular to a longitudinal direction of the holder, and (2) a second region that does not overlap the lens array when viewed from the shorthand direction, and wherein the groove is provided along the longitudinal direction and is longer than the lens array in the longitudinal direction.

2. The exposure head according to claim 1, wherein the opposing surface has an application region between the opening and the groove, the application region being applied with the sealing agent.

3. The exposure head according to claim 2, wherein the holder includes a contacting surface on which a cleaning rod cleaning a light exit surface of the lens array abuts, and wherein the application region and the contacting surface are flat surfaces on a same plane.

4. The exposure head according to claim 3, wherein the gap is a first gap, the side wall of the lens array is a first side wall, and the edge of the opening is a first edge, wherein the sealing agent seals a second gap between a second side wall of the lens array opposite to the first side wall and a second edge of the opening facing the second side wall, and wherein the contacting surface is a first contacting surface, the groove is a first groove, the opposing surface has a second contacting surface on which the cleaning rod abuts on a side opposite to the first contacting surface with respect to the lens array, and a second groove is formed between the opening and the second contacting surface.

5. The exposure head according to claim 1, wherein the holder is made of metal.

6. The exposure head according to claim 1, wherein a width of the groove is narrower than a width of the lens array in a direction perpendicular to the longitudinal direction and the optical axis direction of the plurality of lenses.

7. The exposure head according to claim 1, wherein the holder includes a contacting surface on which a cleaning rod cleaning a light exit surface of the lens array abuts, and wherein the groove is configured to prevent the sealing agent applied between the groove and the side wall from flowing to the contacting surface.

8. The exposure head according to claim 1, wherein the lens array is fixed with an adhesive at a plurality of locations in the longitudinal direction with respect to the edge of the opening.

9. The exposure head according to claim 1, wherein the light emitting portions are an organic EL layer.

10. An image forming apparatus comprising:

a photoreceptor;

a substrate including a plurality of light emitting portions configured to emit light to expose the photoreceptor;

a lens array including a plurality of lenses configured to condense the light emitted from the plurality of light emitting portions onto the photoreceptor; and a holder configured to hold the substrate and the lens array, wherein the holder includes: (1) an opposing surface including an opening into which the lens array is inserted, the opposing surface facing the photoreceptor in an optical axis direction of the plurality of lenses; (2) a sealing agent configured to seal a gap between a side wall of the lens array and an edge of the opening; and (3) a groove formed in the opposing surface, wherein the sealing agent is applied between the groove and the side wall, wherein the groove includes: (1) a first region that overlaps the lens array when viewed from a shorthand direction perpendicular to a longitudinal direction of the holder, and (2) a second region that does not overlap the lens array when viewed from the shorthand direction, and wherein the groove is provided along the longitudinal direction and is longer than the lens array in the longitudinal direction.

11. The image forming apparatus according to claim 10, wherein the opposing surface has an application region between the opening and the groove, the application region being applied with the sealing agent.

12. The image forming apparatus according to claim 11, wherein the holder includes a contacting surface on which a cleaning rod cleaning a light exit surface of the lens array abuts, and wherein the application region and the contacting surface are flat surfaces on a same plane.

13. The image forming apparatus according to claim 12, wherein the gap is a first gap, the side wall of the lens array is a first side wall, and the edge of the opening is a first edge, wherein the sealing agent seals a second gap between a second side wall of the lens array opposite to the first side wall and a second edge of the opening facing the second side wall, and wherein the contacting surface is a first contacting surface, the groove is a first groove, the opposing surface has a second contacting surface on which the cleaning rod abuts on a side opposite to the first contacting surface with respect to the lens array, and a second groove is formed between the opening and the second contacting surface.

14. The image forming apparatus according to claim 10, wherein the holder is made of metal.

15. The image forming apparatus according to claim 10, wherein a width of the groove is wider than a width of the lens array in a direction perpendicular to the longitudinal direction and the optical axis direction of the lenses.

16. The image forming apparatus according to claim 10, wherein a width of the groove is narrower than a width of the lens array in a direction perpendicular to the longitudinal direction and the optical axis direction of the lenses.

17. The image forming apparatus according to claim 10, wherein the holder includes a contacting surface on which a cleaning rod cleaning a light exit surface of the lens array abuts, and wherein the groove is configured to prevent the sealing agent applied between the groove and the side wall from flowing to the contacting surface.

18. The image forming apparatus according to claim 10, wherein the lens array is fixed with an adhesive at a plurality of locations in the longitudinal direction with respect to the edge of the opening.

19. The image forming apparatus according to claim 10, wherein the light emitting portions are an organic EL layer.

* * * * *